US010115265B2

(12) United States Patent
Froelich et al.

(10) Patent No.: US 10,115,265 B2
(45) Date of Patent: Oct. 30, 2018

(54) DEVICE FOR INSTANT LOTTERY TICKET INSPECTION AND ACTIVATION, AND METHOD AND SYSTEM FOR SAME

(71) Applicant: The Froelich Group LLC, Lake Forest, IL (US)

(72) Inventors: Christian Michael Froelich, Lake Forest, IL (US); Troy William Livingston, Northbrook, IL (US); Daniel William Livingston, Libertyville, IL (US)

(73) Assignee: The Froelich Group LLC, Lake Forest, IL (US)

( * ) Notice: Subject to any disclaimer, the term of this patent is extended or adjusted under 35 U.S.C. 154(b) by 0 days.

(21) Appl. No.: 15/434,171

(22) Filed: Feb. 16, 2017

(65) Prior Publication Data

US 2017/0236371 A1 Aug. 17, 2017

Related U.S. Application Data

(60) Provisional application No. 62/296,266, filed on Feb. 17, 2016.

(51) Int. Cl.
*G06F 17/00* (2006.01)
*G07F 17/32* (2006.01)

(52) U.S. Cl.
CPC ........ *G07F 17/3241* (2013.01); *G07F 17/329* (2013.01); *G07F 17/3227* (2013.01)

(58) Field of Classification Search
None
See application file for complete search history.

(56) References Cited

U.S. PATENT DOCUMENTS 7,344,086 B2 * 3/2008 Grossman ............... A63F 3/065 235/487
9,224,269 B2 12/2015 Zacharakis et al.
9,824,346 B2 * 11/2017 Zygula ................. G06Q 20/202
2004/0023711 A1 * 2/2004 Knapp .................. A63F 3/0665 463/17
2005/0040591 A1 2/2005 Scrymgeour et al.
(Continued)

FOREIGN PATENT DOCUMENTS

CA 2 322 826 A1 9/1999
GB 2461031 A 12/2009
(Continued)

*Primary Examiner* — Ronald Laneau
(74) *Attorney, Agent, or Firm* — Taft Stettinius & Hollister LLP

(57) ABSTRACT

A device, system, and method are provided for inspecting, activating or voiding scratch-off instant lottery tickets. A remote point-of-sale device has a detector system that detects tampering with the coating placed over concealed game play information on the tickets, and reads coded identification and authentication information on the tickets. The device automatically communicates the coded identification and tampering data to a central computer system of a lottery. The central computer system provides activation signals back to the point of sale on a ticket-by-ticket basis. The device, method and system provide automated generation and communication of ticket-by-ticket tampering, activation, and voiding data between the remote device and a central computer system of a lottery.

43 Claims, 7 Drawing Sheets

(56) References Cited

U.S. PATENT DOCUMENTS

| | | | |
|---|---|---|---|
| 2006/0018673 | A1 | 1/2006 | Choi |
| 2008/0012220 | A1 | 1/2008 | O'Neill |
| 2009/0163263 | A1 | 6/2009 | Herndon et al. |
| 2010/0130041 | A1 | 5/2010 | Tsujimoto |
| 2010/0253063 | A1 | 10/2010 | Skogster |
| 2011/0161661 | A1 | 6/2011 | Medvinsky et al. |
| 2011/0183748 | A1* | 7/2011 | Wilson .................... G07F 17/32 463/25 |
| 2012/0138688 | A1 | 6/2012 | Young |
| 2012/0235400 | A1 | 9/2012 | Scrymgeour |
| 2013/0204777 | A1 | 8/2013 | Irwin, Jr. et al. |
| 2013/0260856 | A1 | 10/2013 | Irwin, Jr. et al. |
| 2015/0066694 | A1 | 3/2015 | Irwin, Jr. et al. |
| 2015/0112858 | A1 | 4/2015 | Irwin, Jr. et al. |
| 2015/0161846 | A1 | 6/2015 | Rouh et al. |
| 2015/0339886 | A1* | 11/2015 | Pinkus ................ G07F 17/3241 463/25 |
| 2017/0018048 | A1 | 1/2017 | Kent et al. |

FOREIGN PATENT DOCUMENTS

| | | | |
|---|---|---|---|
| WO | WO 99/62019 | A1 | 12/1999 |
| WO | WO 2017/013530 | A1 | 1/2017 |

* cited by examiner

DEVICE FOR INSTANT LOTTERY TICKET INSPECTION AND ACTIVATION, AND METHOD AND SYSTEM FOR SAME

CROSS REFERENCE TO RELATED APPLICATIONS

Priority is hereby claimed to U.S. Provisional Patent Application No. 62/296,266 filed on Feb. 17, 2016, the contents of which are incorporated by reference herein in their entirety.

FIELD OF THE INVENTION

The present subject matter relates to a device for point-of-sale inspection, activation, and voiding of eligible and ineligible (respectively) instant "scratch-off" type lottery tickets by a lottery. The subject matter also relates to a system, method, and computer-readable medium that allow lotteries to effect point-of-sale inspection and activation of their instant lottery tickets.

BACKGROUND OF THE INVENTION

Currently, there is no method in use by which a lottery may activate single instant tickets and track their sales in real time. Consequently, lottery instant ticket retailers cannot be charged for what they have sold. Rather, they must be charged using one or more different methodologies employed by different lottery agencies from around the world. Regardless of methodology, the end result is a tremendous accounting margin of error that creates exposure to fraud and malfeasance. Typically current methodology requires the use of modified accrual accounting rather than the accrual accounting method mandated for comparable (sales over $5 million/year), non-government businesses.

Aside from a number of other issues resulting from this shortcoming, a major problem is the fact that a lottery's inability to charge a licensed retailer for exactly what they have sold (thus necessitating the use of modified accrual accounting) the great number of different sales tracking and accounting methodologies presents a barrier to distribution of instant lottery tickets through larger, national chain retailers (or any retailer with $5M or more in annual sales). Often such retailers require, to comply with Generally Accepted Accounting Principles, a single consistent tracking, verification, and accounting system for sales. Thus, such large retailers generally are unwilling or unable to manage or accept the many lotteries' different tracking and accounting techniques for instant lottery tickets, which often are greatly varied and inconsistent.

Upon sale of an instant, scratch-off ticket, lottery retailers must record the individual transaction for the purpose of tracking inventory and lottery invoicing. A small percentage of retailers use barcode scanners in combination with a point of sale system to scan a Universal Product Code (UPC) barcode printed on the rear surface of every scratch-off ticket. This scan records the sale in the retailer's point of sale system. This data allows the retailer to track his or her own inventory, their total sales, and after performing additional calculations (specific to each lottery), derive their financial liability to the lottery. Retailers without a point of sale system use either a paper journal to hand-write sales records or disregard sales tracking altogether. In either event, none of this sales data is communicated back to the lottery's main computer system, and the lottery is forced to estimate sales while charging their retailers an amount that is not consistent with the retailers' actual sales. Consequently, the retailer becomes the party responsible for maintaining their actual sales and inventory data.

Therefore, using the current methodology accepted by most lotteries across the world, to the lottery, the sale of an individual scratch-off ticket is at best only assumed to have occurred. Whether the lottery is estimating sales based on a limited amount of data derived through the gaming system (relative to instant tickets) or by performing a physical inventory count using a hand-held scanner (used in conjunction with the central gaming system and the gaming system's inventory data), the time of an actual sale of any specific ticket is not known—only surmised.

Usually, each lottery has a central gaming system (aka the "gaming system," "central gaming system," or "central computer system"). Typically, the lottery's central gaming system is a computer-implemented system for accounting for lottery ticket sales and otherwise conducting the functions of the lottery. The central gaming system includes memory devices for storage of the master data set that contains the authentication (identification) data for each of the instant lottery tickets, and contains the validation data (i.e., whether a particular ticket is associated with a prize, and if so, the value of the prize). In some instances, the central gaming system is an in-house computer-based system that is owned and operated directly by a lottery. In other instances, the central gaming system is owned and operated by a contractor hired by the lottery. In either situation, the central gaming system's database can be divided such that its operations are controlled by separate servers, possibly housed at separate locations. For example, for security reasons, servers operating and maintaining an authentication database might be housed and operated separately from servers operating and maintaining a validation database.

On a typical instant scratch-off lottery ticket, the lottery prints three codes. A representative example of a scratch-off lottery ticket 1 is shown in FIGS. 1 and 2. First, as described above, there is a UPC barcode 13 that is displayed, usually on the rear surface 11 (back side, see FIG. 2) of the ticket 1. The UPC barcode 13 contains information identifying the lottery game. Usually a unique UPC barcode 13 is assigned to each different game, and all of the tickets for playing that particular instant lottery game have the same UPC barcode 13 printed on them. It is noted that "code" and "barcode" as used in this disclosure may be interpreted preferably interchangeably and preferably in reference to typical known code formats currently in use on lottery tickets, including 2D barcodes, QR codes, and similar known types of codes or barcodes.

Second, there is also displayed on the ticket 1, typically on its rear surface 11 (back side, see FIG. 2), an "authentication code," which is usually in the form of a barcode or QR code. The authentication code 12 is unique to the particular lottery ticket. The authentication code 12 contains unique identifying information (i.e., authentication data) pertaining to that ticket that, when scanned by a barcode reader and transmitted to the lottery's central gaming system, can be matched up to a corresponding record in the master data set in the database of the central gaming system. Typically, the record in the master data set in the database would contain all information relative to that lottery ticket (i.e. the name of the game, the sale price, the prize associated with that specific ticket, etc.) as well as any transactions processed through the system relative to that specific ticket. Using the equipment made available to them, scanning the displayed authentication code 12 does not, however, reveal to the lottery retailer or player any data. On the other hand, when a winning ticket is presented at a lottery claim center, when scanned, the lottery's internal system can derive all information in the master data set.

The third code printed on a typical scratch-off lottery ticket 1 is a "validation code," designated with reference numeral 5 in FIG. 1. The validation code 5 typically is contained within a game play area 3 on the ticket 1, usually on the front surface 2 of the ticket 1. The game play area 3 contains game play information that is concealed under a coating 4 before play of the ticket 1. Typically, the coating 4 is formed of latex or other suitable material that is scratched off by the player to reveal the game play area 3 after the player has purchased the ticket. This game play area 3 contains all of the information required to actually play the lottery game. In most tickets used today, the game play information contains game play symbols 7 relating to the particular game being played. These symbols are readable by the player after the coating 4 is scratched off, e.g., a set of letters or numerals that must be matched to a winning combination in order for the player to win a prize. The sample ticket 1 in FIG. 1 shows the coating 4 partially scratched off to show a partially scratched off portion 10 of the game play area 3 revealing the validation code 5 and a number of game play symbols 7.

In most scratch-off instant lottery tickets used today, the game play area 3 under the coating 4 also contains the validation code 5. This validation code 5, typically a barcode, contains coded information identifying the unique identity of the ticket associated with prize information specific to that ticket that is stored within the master data set stored in the central gaming system's computer. The unique identifying information contained within the validation code 5 is used to "validate" a ticket, that is, to check to see if the ticket is a winner or loser. After the latex coating 4 is scratched off this validation code 5, the code 5 is scanned by a scanning machine connected to the central gaming system. The scan identifies the unique identifying information contained in the validation code 5 on the ticket. The system reconciles the information against a data set stored in the central gaming system that contains prize information for each ticket, and sends a communication back to the point-of-sale (POS) machine to convey that prize information to the retailer or player. The validation code 5 is typically reconciled against a secondary data sheet in the lottery's central gaming system, which also contains instructions that get conveyed to the retailer or player at a retail location (e.g., "$5 Win," or "Please visit lottery claim center" which may signal that a large prize is to be collected by the player at the claim center). This is the validation process.

Under current, typical instant ticket sales practices, once a ticket is validated (that is, confirmed to be a winning or losing ticket), the lottery then is forced to assume that all tickets from the same pack with a lower numerical value have also been sold. This requires that tickets be sold sequentially. This practice also does not capture and account for non-validated tickets that were sold after the most recently validated ticket. Therefore, this practice cannot accurately track instant ticket sales at any given point in time. With the majority of lotteries selling a large number of different instant ticket games (up to 100 different games in some lotteries), combined with the fact that there may be thousands to tens of thousands of retailers selling these tickets, for any and almost every lottery, millions of dollars if not tens of millions of dollars are continuously unaccounted for.

Under the current methodology, when retailer inventory needs to be adjusted, it is incumbent upon the retailer or the lottery sales agent responsible for the retailer to determine when and what tickets to order. If the retailer determines that more instant tickets are required, through a variety of different methods, the retailer places an order through the lottery for those additional tickets. This order usually involves the retailer calling a 1-800 number and placing an order with a lottery sales agent. Some lotteries enable their sales agents to manage retailer inventory using sales force automation software, but its capabilities are limited by the information collected by the lottery. Since the lottery cannot track real-time sales, the software cannot fully automate inventory; it can only estimate inventory levels.

Once an order of instant tickets is placed, "inactive" tickets are then shipped to the retailer. Inactive tickets are recorded in the main database in the central gaming system but players are not eligible to claim a prize associated with an inactive ticket until that ticket has become active for play (this is to prevent unsold tickets from being played or having any value associated with them). As such, prior to placing the pack of new tickets up for sale, the retailer must login to the lottery's existing POS gaming system, direct it to record an activation, and finally, scan to activate the pack (for example, by using a built-in scanner on the lottery POS system to scan a barcode on the wrapper of the pack). At this point, assuming the electronic transaction was processed accurately, the entire pack of instant tickets becomes active and for all intents and purposes, at this point, each ticket becomes a bearer instrument. As such, the tickets now become a liability for the retailer, in that, if tickets are stolen and the theft goes unknown to the owner of the lottery retail location, then the licensed retailer is liable for the price of that ticket.

In order for the lottery to derive sales and determine how much to charge each retailer through a recurring bank account sweep, lotteries are forced to use the "pack settlement" method (which simply means tracking sales on a pack basis rather than on an individual ticket basis). This method often uses one or more triggers (based on the limited amount of ascertainable information a lottery has at a given time with respect to instant ticket activity) to record the sale and charge the retailer for an entire pack of activated tickets.

One of the most common methods involves a time trigger. Under this method, once a book of instant tickets has been activated, after a set time period regardless of sales volume, that book of tickets will "settle" and trigger the retailers' financial liability and the lottery's record of sales for all tickets in that pack regardless of how many were sold. This means a retailer could activate a 30-pack of $30 tickets, sell none but still be charged (and the lottery record as a sale) the full $900. Alternatively, a retailer could activate and sell thousands of dollars of tickets during this time frame without 1) the lottery knowing the sales occurred 2) being financially liable for the tickets for some time (so the lottery is "floating" their instant ticket inventory. As is often the reality in these cases, the retailers may use lottery revenues for their own benefit until they need to reimburse the lottery. Often times, this results in a retailer not having sufficient funds to cover their liabilities and the retailer is either penalized or loses their license as a result).

Another method may involve using validation data (the number of winning tickets scanned to check for a prize from a given pack) to make a best guess at the retailer's sales/financial liability and therefore trigger a settlement (example: 90% of the lower-tiered prizes in a pack have been validated/sold and the pack therefore settles). By knowing how many tickets of a particular game are contained in a pack, the lottery uses validation data to surmise that all tickets with unique ID numbers lower than the validated ticket (at the same retailer) were sold. Both methods create uncertainty for the retailer and the lottery because there will always be tickets that have sold but not settled or settled without being sold. Either way, the lottery's sales and inventory data is inaccurate.

Generally, at present, the main method used by lotteries to address the lack of real-time sales tracking capability and the subsequent accounting, security and operational control issues is to sell instant tickets through instant ticket dispensing machines. Although such machines are widely used by lotteries around the world, self-service dispensing machines bridge a gap rather than filling one. They allow lotteries limited access to retailers that are unwilling or unable to sell instant tickets through the traditional channels, however there are a number of limitations.

With respect to fraud, because they have access to activated but unsold instant tickets, lottery retailers and/or their employees may attempt to determine if an instant ticket is a winning ticket prior to sale in order to separate winning tickets from losing tickets. After the winning instant tickets are identified, the retailer may then sell the losing tickets to lottery customers while retaining the winning tickets to be purchased by themselves (if retailers are permitted to play) or an accomplice. One commonly used method of perpetrating this type of fraud involves the retailer removing the least amount of scratch-off material necessary in order to identify whether or not the ticket is a winner.

The shortcomings of the present methodologies result in 1) an inability on behalf of the respective lottery, to know within a reasonable timeframe when an instant ticket was sold, 2) an inability on behalf of the respective lottery to determine if an instant ticket has been tampered with before it has been sold (e.g., inability to conduct a check to see if someone tampered with the latex coating 4 to show whether the ticket was a winning ticket, before purchasing it), 3) an inability on behalf of the respective lottery to manage inventory and individual retailer product mix in a timely, automated manner, 4) unknown financial liability on behalf of the lottery retailer which can result in an inability to collect funds due from the retailer, 5) unknown prize liability on behalf of the lottery itself 6) retailer inventory is subject to theft, 7) an inability on behalf of all lotteries and their retailers that sell instant, scratch-off tickets to use accrual accounting, 8) multiple opportunities for fraud, 9) an inability to use sales data to support marketing and advertising campaigns and 10) an extremely arbitrary accounting method that ultimately precludes lotteries from selling through retailers bound by accrual accounting.

Combined, these shortcomings result in four major deficiencies in the current system: 1) wildly inaccurate sales numbers, 2) an inability to satisfy GAAP accounting practices, 3) an inability to identify and curb basic tampering and fraud (on behalf of players and the lottery itself), and 4) for an individual lottery, millions if not billions of dollars of lost sales every year due to sales practices that prevent sales of instant lottery tickets through retailers that generate over $5 million in annual sales.

SUMMARY OF THE INVENTION

The inventors assessed current lottery technologies and discovered the various shortcomings noted above. As noted above, the inventors observed that large retailers generally are unwilling or unable to manage or accept the many lotteries' different tracking and accounting techniques. Therefore, the inventors formed the realization that lotteries are foregoing tremendous revenue opportunities that would be available if instant lottery tickets could be sold in a more efficient manner.

They wondered about the possibility of finding solutions to overcome the various shortcomings, and in response, they brainstormed and developed a variety of improvements to facilitate better tracking and validation of instant ticket sales, which improvements could afford significant time and money savings, and also provide tremendous convenience to retailers and lottery providers. In terms of contemplating improvements to deterring fraud, these improvements could be tremendously advantageous to retailers of any size.

They contemplated a device, system, computer-readable medium, and method for point-of-sale inspection, activation and voiding of eligible and ineligible (respectively) instant "scratch-off" type lottery tickets. The method uses a point-of-sale remote device that analyzes the integrity of the latex coating 4 that typically covers the game play surface of instant "scratch-off" lottery tickets. The method, system, and medium can involve use of the remote device to electronically communicate with a central computer system containing at least one database wherein prior activation and validation data for each ticket is stored, to check for activation status and possible fraudulent activity. One or more embodiments allows tampering detection and instant activation of scratch-off tickets, destruction or deformation by the remote device of tickets associated with indications of tampering or fraud, and prompt communication of activation, voiding and sales information between the central and remote systems in order to provide enhanced security and accounting in the sales of instant lottery tickets.

The inventors contemplated that regular communication between the remote device and the central computer system regarding sales/activation activity could potentially deter theft from an inventory of unactivated instant tickets. In this regard, if a thief stole unactivated tickets from inventory, scratched off the coating, and then attempted to redeem a winning ticket, the retailer's device could detect a lack of activation for that ticket/pre-sale tampering, thereby thwarting the thief.

In various embodiments, different forms of tamper detection apparatus may be employed to determine whether tickets have been tampered with prior to sale. For example, one or more embodiments may employ a video detector to detect any abnormalities in the ticket's coating. Another embodiment might employ an acoustic detector that measures acoustic waves projected onto the coating. Either of these two foregoing embodiments (and other embodiments described herein) could have an advantage of providing tamper detection in a way that does not damage the coating. This way, if the tamper detection apparatus determines that the ticket has not been tampered with, the ticket could optionally be placed back in inventory and sold at a later date.

Also, one or more embodiments could include a ticket marker that physically, and perhaps conspicuously, alters a ticket to indicate that it has been tampered with. This could have the advantage of inhibiting attempts to use the tampered-with ticket at another retail location.

In another embodiment, the tamper detection apparatus could employ multiple tamper detectors. For example, an acoustic detector could be used in combination with a video detector (and potentially additional forms of tamper detectors). This way, if one tamper detector fails, the other detector may still be effective to detect tampering. Usage of multiple tamper detectors could be especially advantageous in situations where a bad actor finds a way to bypass one form of tamper detector, considering that some devious retailers and/or her employees may attempt various forms of tampering strategies prior to sale and then evaluate whether a particular strategy is detected.

In one or more embodiments, the tamper detection apparatus could be universal in that it may be used with a variety of instant lottery tickets from different suppliers and lotteries. This could be especially advantageous in a variety of situations. For example, if a lottery decides to change its instant ticket provider, certain aspects of the tickets may change (size, shape, thickness of latex coating, etc.). In one or more embodiments, such changes will not affect the stated operation of the device, system and method.

DETAILED DESCRIPTION

The present subject matter includes a device, system, and method of inspecting, activating, validating, and voiding scratch-off lottery tickets that bear game play data covered by a scratch-off coating, and display ticket authentication data. The method and system include steps of using a remote device equipped with scanning or other detection means to detect tampering with the coating. Use of the device provides a method and system whereby automated tampering detection can be conducted using the device at the point of sale of the instant scratch-off lottery ticket. This allows for an improved system whereby the system allows lottery retailers (with the consent or under the direction of the lottery) to display instant tickets for sale within reach of the consumer. Tickets no longer need to be protected from the consumer or locked up inside a vending machine or behind a retailer's counter. In an embodiment, the remote device and system are connected to communicate ticket tampering and authentication information to a central computer system or central gaming system. The ticket tampering and authentication information received in the central system is then compiled in order to allow real-time accounting for and control of instant scratch-off lottery ticket sales.

Figure 1:
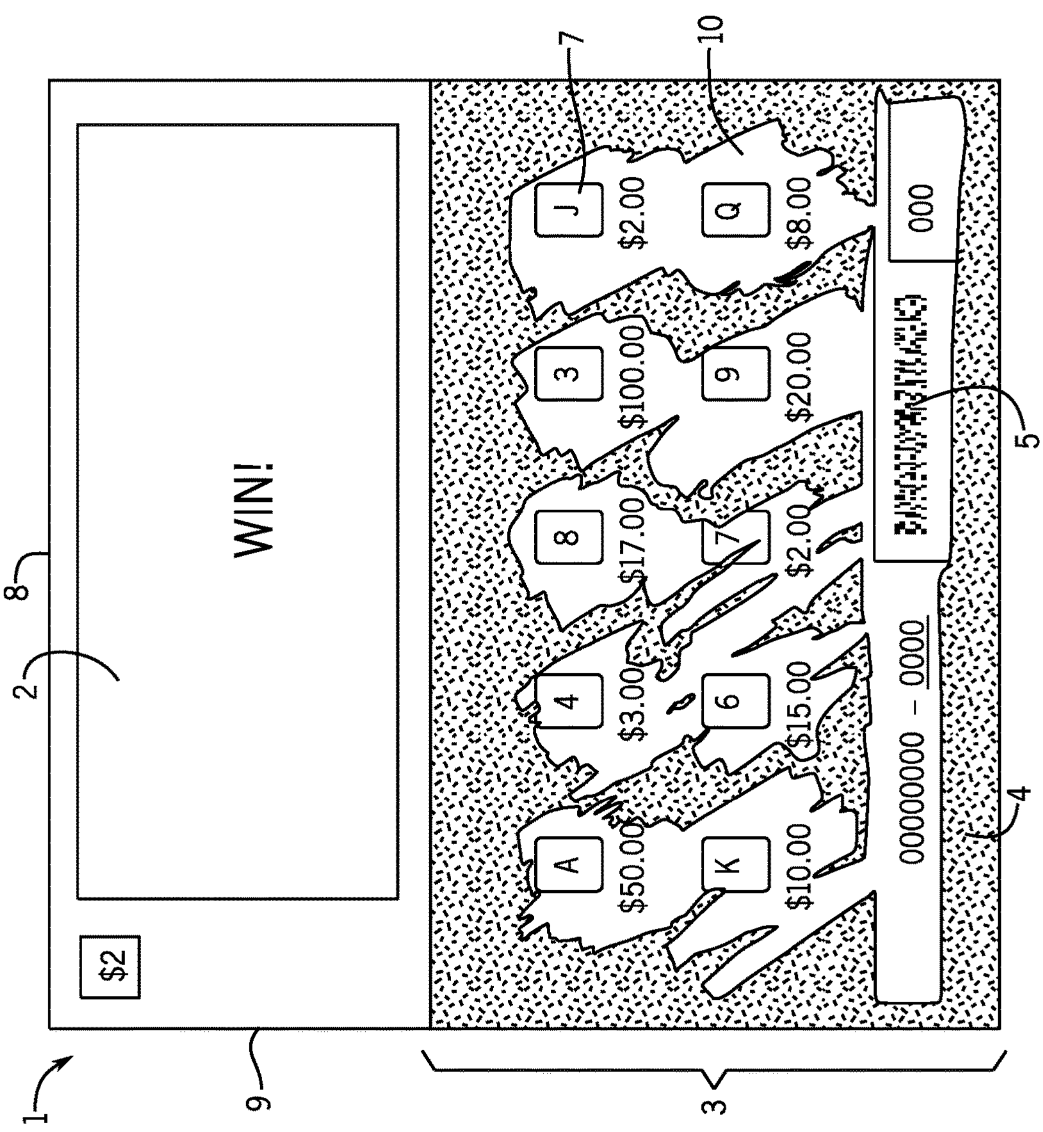
FIG. 1 PRIOR ART
FIG. 1 is a view of a front surface of a printed scratch-off lottery ticket.
Figure 2:
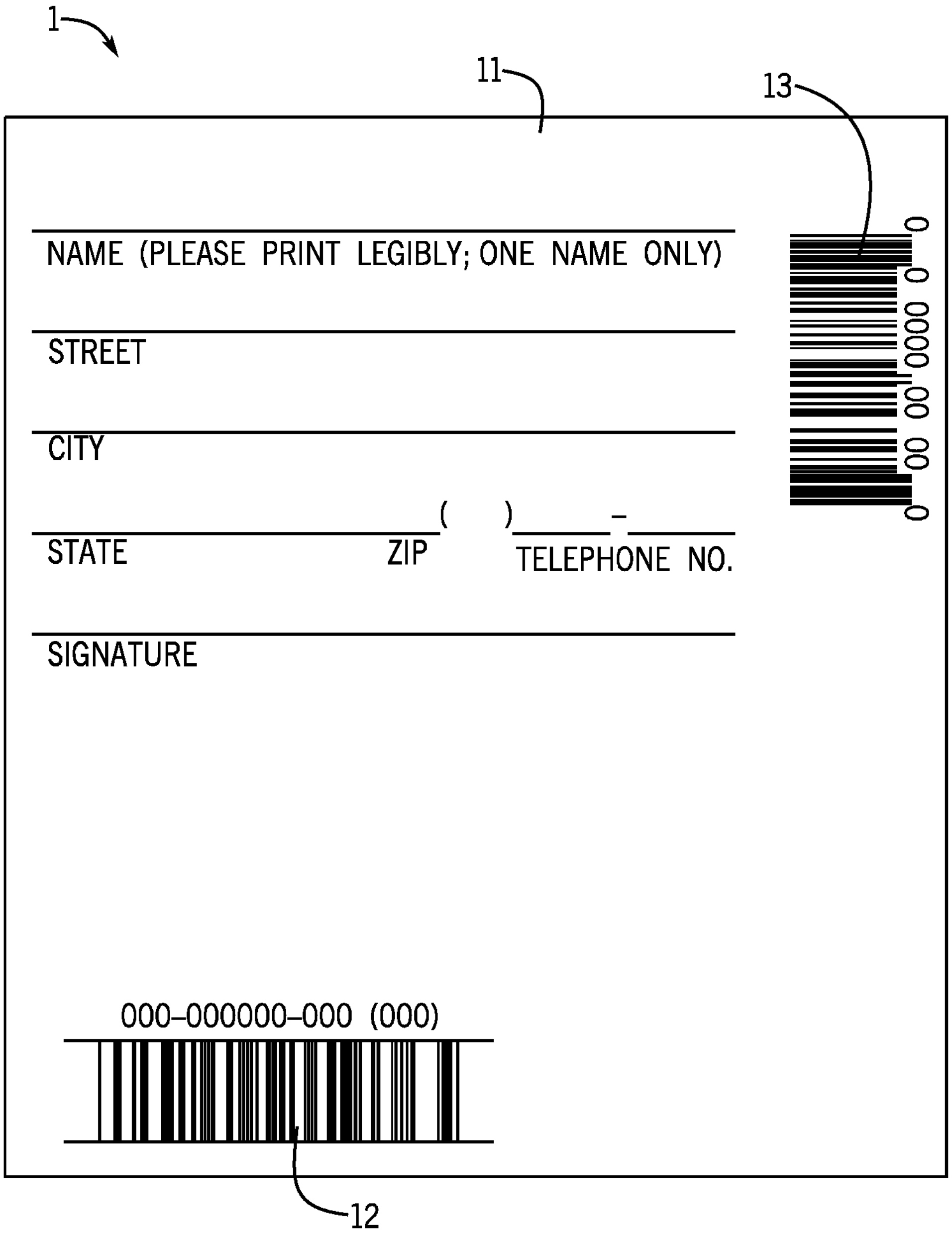
FIG. 2 PRIOR ART
FIG. 2 is a view of a rear surface of a printed scratch-off lottery ticket.
Figure 3:
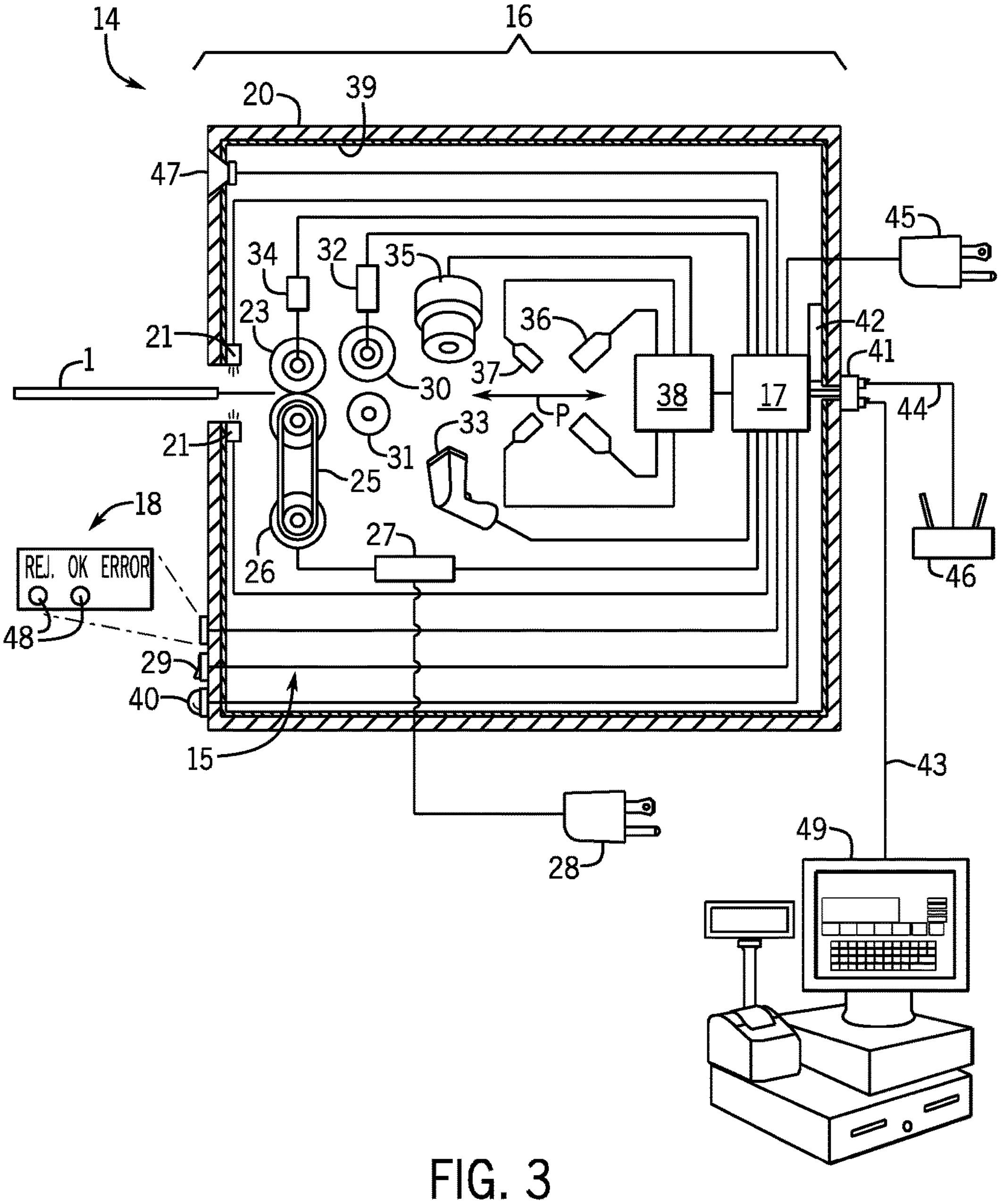
FIG. 3 is a schematic diagram representing an embodiment of a remote device for instant lottery ticket inspection and activation.

The components of the remote device 14 according to an embodiment of the invention are schematically represented in FIG. 3.

As shown in FIG. 3, the device comprises a ticket handling system (referred to herein as handler 15), a detector system (referred to herein as detector 16) for analyzing tickets, a controller 17 that preferably comprises at least one computer processor, and an indicator system (referred to herein as indicator 18) that can send signals to a user related to use of the device 14. A scratch-off lottery ticket 1 is shown in FIG. 3 in a position immediately prior to insertion of the ticket 1 into the device by a user. The user moves the ticket into position to insert the ticket 1 starting with its upper edge 8 into a slot 19 (opening) formed in an outer housing 20 of the device 14, an insertion sensor 21, in the nature of an optical sensor or electric eye, detects the presence of the ticket 1. The presence triggers the generation of an electronic signal by the sensor 21 directed to the controller 17, containing information indicating that the controller 17 should activate the handler 15 and detector 16 mechanisms to perform the inspection steps. The controller 17 directs the handler 15 to commence operations to convey the ticket inside the chamber 22 that is formed within the housing 20 of the device 14. The handler 15 then conveys the ticket along a ticket path identified by line P in FIG. 3, preferably guiding the ticket into position by side walls of the path area abutting lateral edges 9 of the ticket 1. The handler 15 conveys the ticket 1 into the chamber 22 of the device into a position where tampering evidence can be detected by the detector 15.

The components of the handler 15 are schematically depicted in FIG. 3. The handler 15 may preferably be in the nature of a document handler mechanism, such as known handler devices used in an ATM machine for receiving insertion of cash and bank checks. In such an embodiment, the handler 15 loads the ticket into the device 14 via a grab and roll method. The ticket is grabbed and squeezed between two abutted transport rollers 23, 24 (preferably formed of plastic or rubber materials). The rollers 23, 24 are rotated by action of a drive belt 25 that is driven by the action of a drive motor 26. The drive motor 26 preferably is an electric DC motor that has its on/off and directional operation controlled by a motor driver 27. The motor driver 27 in turn has its operation controlled by electronic drive signals received from the controller 17, in response to electronic signals received from the sensor 21 and the detector 16, as more fully described herein. The components of the handler mechanism are powered by an electric power supply source 28. The handler mechanism may also preferably be adapted to reconvey or eject the ticket back out to the exterior of the device or to retain the ticket within the device, under in certain conditions as instructed by the controller.

The handling system of the device 14 includes return means for returning a ticket to the exterior of the device after the detection process has been completed, or upon a signal from a user (e.g., pressing an electrically connected switch 29) is made to return the ticket. The device preferably comprises a ticket return means that ejects the ticket to the exterior of the device on a front side of the device. Ejection may be accomplished by reversing the direction of conveyance of the ticket by reversing the rolling direction of rollers 23, 24 by operation of the drive motor 26. Depending on the preferred implementation of the device in different sales environments, the device may have a ticket return means that ejects the ticket to the exterior of the device on a rear side of the device.

The handler 15 also may preferably include a marker, namely means or mechanisms for marking tickets that have been inspected and found to exhibit evidence of tampering. Depending on the lottery game in question, it may be preferable to physically mark a tampered ticket so operators may easily see that a ticket has been determined to be void or ineligible for play. An embodiment of such a marker is depicted in FIG. 3, in the form of a deformation roller mechanism, which embosses a depression into the surface of the ticket to show that it is void. The deformation roller includes an upper roller 30 and a lower roller 31, which are activated to move toward one another to sandwich a ticket between them in the ticket path P upon receipt of an electronic signal from the controller 17 indicating the ticket is void and should be marked. The electronic signal preferably activates a deformation roller solenoid 32 that moves one of the rollers 30 toward the other roller 31, so as to sandwich the ticket between the two rollers upon solenoid activation. One of the deformation rollers is a male roller 30 bearing outwardly-extending projections formed in the outer circumferential surface of the roller 30 that press into and deform the ticket surface. The female roller 31 preferably has corresponding inwardly-extending depressions formed in its outer circumferential surface, to receive insertion of the projections and thereby aid deformation of the paper ticket. Other forms of marking mechanisms may include a cutting mechanism that notches, slices, or cuts up the ticket, or an ink marking mechanism that applies ink to the ticket surface that it is recognized by users of being void.

As a marking system, the deformation roller system as described above is preferred, as being specially adapted to mark as void a great number of instant lottery tickets while producing no paper chaff, chips, or residues from hole-punching or cutting operations. Such chaff would build up inside the tamperproof housing, and thus require occasional opening of the tamperproof housing of the device, or require an outlet in the housing for removal of the chaff, accordingly tending to lessen the security of the device by allowing access through the otherwise tamperproof sealing of the housing.

The detector system (designated as detector 16) also is depicted schematically in FIG. 3. The purpose of the detector 16 is (1) to collect the identification and authentication data that is contained in the UPC barcode 13 and authentication code 12 on the ticket; and (2) to search for changes or imperfections in the latex scratch-off coating 4 that might indicate tampering. The detector 16 may preferably identify the ticket 1 and detect tampering with the scratch-off coating 4 by a number of different means, explained below. Based on this detection function, the detector 16 generates an electronic signal containing tampering status information concerning the ticket, indicating the ticket's status as a tampered ticket that should be voided by the system, or an intact ticket that is eligible for activation for play. The tampering status information is sent to the controller 17 by the detector 16 or a microprocessor thereof.

As shown in FIG. 3, the detector 16 preferably includes as one type of detection means a barcode scanner or reader 33 positioned along the path P on a bottom side of the path P, so as to read the barcodes that are typically printed on the rear surface of each instant scratch-off lottery ticket 1. As explained previously, typically there are two barcodes printed on the rear surface 11 of each instant lottery ticket 1, and the barcodes are not concealed by a scratch-off coating 4. These codes are the UPC barcode 13 that identifies the lottery game to which the ticket pertains, and an authentication code 12 which is unique to each ticket, and which contains the authentication information for that ticket. The authentication information (i.e., authentication data) can be correlated to data stored in the central gaming system that pertains to and confirms the identity of that particular ticket. These codes may be in the form of barcodes, QR codes, or other typical optical recognition code types typically in use on instant lottery tickets. As is known in the field, the barcode reader 33 captures an image of the codes, and for each code image captured, generates an electronic signal based on the image that contains the data embedded in the image, and communicates that signal to a barcode recognition module 54 in the controller 17, which will parse the data in the signal for communication to the central lottery system and/or the retailer's point-of-sale computer system, which may include retail check-out registers.

Some past attempts at tampering with instant scratch-off lottery tickets have involved removal and replacement of portions of the latex coating 4. However, it is difficult for the tampering person to re-apply a latex coating 4 at a thickness that matches the thickness of the original coating 4. Thus, an embodiment of the device 14 as shown in FIG. 3 includes a detector system that comprises a thickness measurement gauge or similar thickness measuring mechanism. In the embodiment as shown in FIG. 3, the ticket conveyed by the handler 15 will be compressed between a first one (upper) 23 of the two handler rollers and a second one (lower) 24 of the two handler rollers, positioned on upper and lower sides, respectively, of the ticket 1 travelling along path P. The upper roller 23 is supplied with a thickness measurement gauge 34, embodied in FIG. 3 as a thickness transducer. The transducer is positioned on the attachment between the upper roller 23 and the housing 20 of the device 14, and is configured to detect and record information on displacement of the first (upper) roller 23 relative to the path P of the ticket 1. In the embodiment shown in FIG. 3, displacements of roller 23 due to variance in thickness of the ticket 1 would be measured as movements in a vertical direction perpendicular to and relative to the horizontal longitudinal axis of the travel path P of the ticket 1, which is held in its relative horizontal position by upward pressure from lower roller 24. Accordingly, measured displacements of roller 23 provide information on the thickness of the ticket 1 at different points along its longitudinal axis as the ticket 1 is conveyed along the path P. The displacement information collected by the thickness gauge 34 is encoded into an electronic signal that may be sent by the gauge 34 to the controller 17 of the device 14. If the thickness transducer provides to the controller a displacement information indicating that the thickness of a ticket 1 fails to adequately correspond to a known, standard, or pre-set ticket thickness recorded in the memory 51 of the controller or the central game system, then tampering is indicated, and tampering status information indicating tampering is generated relative to this ticket.

As shown in FIG. 3, the detector 16 preferably includes at least one detection means positioned on an upper side of the ticket path for detecting changes or imperfections in the latex scratch-off coating 4 that is positioned on the front surface 2 of the ticket. A device 14 may preferably include more than one detection means in its detector 16.

In an embodiment of the device as shown in FIG. 3, the detector 16 includes an image sensor 35 that operates by capturing a digital optical image of the surface of the latex coating 4, and generating an electrical signal representing the image of the surface of the latex coating 4. The image sensor 35 may be comprised of a CCD or similar image capture devices, such as digital cameras. For each image captured, the image sensor 35 generates data corresponding to the captured image, and generates an electronic signal that includes this data. The signal is transmitted to a detector module 53 in the controller 17. The detector module 53 in the controller parses the signal, and compares the data set in the signal to a corresponding standard data set stored in the memory 51 of the controller that represents a standard image that has no evidence of tampering. If the data set communicated from the image sensor to the detector module 53 deviates sufficiently from the standard data set, tampering is detected, and the ticket is treated as a tampered ticket, as more fully explained below. Alternatively, the comparison may be conducted by the central gaming system after transfer of the data corresponding to the captured image is completed via a communication module 56 of the controller 17.

In an embodiment, the detector 16 as shown in FIG. 3 comprises an image sensor 35 that operates as a video pixel recognition device. The video pixel recognition device captures a video image of the latex coating 4 on the front surface 2 of the ticket. The device converts the image into image pixel count data set, and communicates the captured video pixel count data set of the latex coating 4 to a detector module 53 in the controller 17 of the device 14, via an electronic signal comprising the pixel count data set. The detector module 53 compares the captured video image pixel count data set to a standard video image pixel count data set stored in the memory 51 of the controller, which represents the pixel count of a video image of a ticket bearing no evidence of tampering. If the data set communicated from the image sensor 35 to the detector module 53 deviates sufficiently from the standard data set, tampering is detected, and tampering status information is generated indicating that the ticket is treated as a tampered ticket.

Another embodiment of the device 14 includes detection means as shown in FIG. 3 that comprises a reflectometer including a projection source 36 and a receiver 37. The detector 16 may comprise a microprocessor 38 for control of the projection source 36 and receiver 37, and generation and communication of electronic data and command signals to/from the controller 17, and generating electronic signals comprising data on the reflection levels or patterns detected. Similarly, microprocessor 38 may control operations of other detection means such as the image sensor 35, and generation and communication of electronic data and command signals between the image sensor 35 and the controller 17, including signals comprising data on the images or video pixel counts detected.

The reflectometer may be embodied as a reflectance spectroscope that measures reflectance of radiation projected onto the latex coating 4 by a projection source 36 that directs radiation toward the latex coating 4. As depicted in an embodiment shown in FIG. 3, the radiation source 36 is positioned on an upper side of the ticket path P so as to project radiation upon the latex coating 4 on the front surface 2 of the ticket 1 positioned on the path P. A receiver 37 of the spectroscope is positioned along an upper side of the ticket path P to measure the reflectance of the projected radiation from the front surface of the ticket 1. The reflectance received by the receiver 37 is converted into a data set comprised in an electronic signal communicated to a microprocessor 38 of the detector 16, or to the detector module 53 in the controller 17 of the device 14. The signal may be parsed by the detector module 53, to generate a data set comprising the data on the level of reflectance or patterns of reflectance detected. The reflectance data is compared to a corresponding standard data set stored in a memory 51 of the controller 17, representing a standard level or pattern of reflectance that is expected in a ticket that bears no evidence of tampering. If the data set communicated from the spectroscope to the detector module 53 deviates sufficiently from the standard data set, tampering is detected, and the ticket assigned ticket status information that indicates the ticket is a tampered ticket.

In another embodiment as shown in FIG. 3, the reflectometer may be embodied as an acoustic reflectometer that measures reflectance and/or attenuation of sound waves and patterns of audio or sound waves, such as ultrasound waves. The waves are projected onto the coating 4 on the front surface of the ticket by projection source 36 schematically shown in FIG. 3, provided in this particular embodiment in the form of an audio speaker or transducer of the acoustic reflectometer. A receiver 37 may be provided in this embodiment as an audio receiver, such as a microphone, of the acoustic reflectometer that receives the waves that are reflected by the coating 4 on the front surface of the ticket. For each set of sound waves received by the microphone, the reflectometer, optionally through its own microprocessor, generates data corresponding to the attenuation levels and patterns of the waves, and generates an electronic signal that includes this audio reflection data. The signal is transmitted to a detector module 53 in the controller 17. The detector module 53 in the controller 17 parses the signal, and compares the data set in the signal to a corresponding standard audio reflection data set stored in the memory 51 of the controller, representing a standard wave attenuation level or pattern expected in a ticket that has had no tampering. If the data set communicated from the reflectometer to the detector module 53 deviates sufficiently from the standard data set, tampering is detected, and the ticket assigned ticket status information that indicates the ticket is a tampered ticket.

Another embodiment of the device 14 may preferably include a detector 16 that comprises a chemical composition detector means or mechanism. It is known that tampering efforts in the past have included use of re-applied latex coatings after an original coating was scratched off to reveal a winning ticket. If such re-applied coatings contain chemical components, e.g., pigments or solvents, that differ from those known to be present in latex coatings used in a particular type of ticket, then the tampering that has occurred may be detected by inspection of the chemical composition of the latex coating on the particular ticket.

Spectrometry may be used to detect chemicals in the latex coating 4 for comparison in terms of percentage of composition and types of chemicals contained in the coating, in order to determine if the coating is the original coating, or if instead the coating is a new coating re-applied by a tampering person. The chemical composition detection mechanism of a detector having such an embodiment compares a detected chemical composition of the coating 4 to an expected chemical composition of a standard coating, as stored in a memory 51 of the controller of the device. In such an embodiment, the detector comprises a chemical composition detector that projects a light beam at the coating, vaporizes a portion of the coating to produce a vapor, and analyzes a chemical composition of the vapor to determine chemicals present in the vapor.

Such an embodiment may preferably comprise a radiation emitter that emits a focused, heat-inducing light beam directed at the coating 4. The light beam vaporizes a microscopic portion of the surface area of the latex coating 4. The vapors emitted by the latex coating 4 in response to that irradiation are collected in a sample fed into spectrometer herein embodied as, for example, a gas chromatograph-mass spectrometer of known type. The spectrometer analyzes the chemical composition of the vapor sample. The spectrometer generates a data set based on the vapor sample that includes information on the chemical composition of the vapor. The data set is compared by a processor of the spectrometer (and/or by the detector module 53 of the controller of the device), to a reference data set that reflects the expected chemical composition of the vapor, based on reference data stored in the memory 51 of the controller 17. The reference data is based on the expected chemical composition of a standard, original coating for the type of ticket in question, based on the data of the UPC barcode 13 and authentication barcode 12 read by the barcode reader of the detector. If the data set shows the vapor contains a chemical composition that deviates sufficiently from the expected chemical composition, then tampering is detected, tampering status information is generated indicating the tampered status, and the ticket is treated as a tampered ticket.

In each of the most preferred embodiments set forth above, the detector 16 is preferably configured to detect imperfections in the latex coating 4 without making physical or chemical changes to the coating 4. This is advantageous over devices that employ detection methods or means that alter the latex coating 4, because retaining the original integrity of the ticket's latex coating 4 is preferred in order to maintain saleability of the ticket in the event the ticket undergoes the detection process but then is not actually sold. For example, if the purchaser decides after the detection process to cancel the purchase of the ticket, the ticket can be returned to inventory for eventual sale because its latex coating 4 remains unaltered.

In each of the preferred embodiments of the invention as set forth herein, the detector 16 is preferably configured to detect imperfections in latex coatings on many different types of lottery tickets, in contrast to prior art devices that are compatible for use only with tickets specially configured for use with the particular detector. This "universal detection" feature of the detector as described herein allows use of the detector with a large number of different instant lottery tickets used in playing different lottery games, and from different instant ticket suppliers and lotteries.

In contrast to one or more embodiments set forth herein, prior devices, systems, and methods that are configured to detect tampering by reason of specialized configuration of the ticket lack the flexibility of particular embodiments set forth herein. Such prior art devices also lack the cost-effectiveness offered by a "universal reader" function of the preferred detector embodiments described herein, whereby the remote device as set forth herein can detect tampering regardless of the type of ticket being examined. For example, prior devices or systems might be adapted to detect tampering in specially-configured tickets having specific size dimensions, and specified substrate constructions with certain layering, perforations, or other physical or chemical features that reveal tampering when examined by a particular detector. Prior devices, methods, or systems might be adapted to detect tampering in specially-configured tickets having specific dimensions and/or coatings that include a specialized chemical composition that is designed to be detected by chemical sensors in the particular detector configured to detect that specialized composition.

Other prior devices, systems or methods may rely upon specially manufactured tickets that incorporate physical or chemical characteristics in the tickets or their coatings that are necessary for operation of the particular detection unit (e.g., luminescent or light-absorbent chemicals, or material that becomes visible or changes color upon application of heat or electrical charge). In other prior methods or systems, the lottery ticket or its coatings must have uniform dimensions and contain a specialized feature such as a: particular latex pattern; specific graphic image marking; certain magnetic, conductive, or electro-sensitive material; particular radio frequency identifier; or specific coloring pattern, that the detection unit is configured to detect in order to find tampering.

The most preferred embodiments of the device herein comprise detectors that maximize flexibility for use of latex coatings that have standard latex coating structure and composition widely used in the lottery industry. The most preferred embodiments herein can be used on the largest variety of tickets, containing a wide range of different exposed or concealed printing or other surface features. The invention is configured such that the maximum number of ticket configurations can be inspected, including instant lottery tickets having a number of different latex coating portions positioned in differing locations on the tickets.

The most preferred embodiments of the device herein comprise a detector that measures tampering factors based on reflection back from the coating 4 surface (e.g., the spectroscope measuring reflectance, as described above). The preferred embodiments thus reduce the amount of light or other radiation that is necessary to achieve collection of data showing evidence of tampering. Accordingly, the cost, size and complexity of the detection unit within the device is minimized, and space is made available for an additional detection unit on the opposite side of the ticket intended for reading information on the opposite side, such as a barcode scanner 33 that reads the UPC barcode 13 and authentication code 12 that typically are printed on the side of the ticket opposite to the side bearing the latex coating 4.

The detector system of the device as described herein is preferably adapted to accept tickets that have imperfections in the coating 4 that do not exceed a certain pre-set acceptable level or rate of occurrence of detected imperfections. That is, not all original latex coatings are perfect, and so the device should not generate a tampering signal for tickets that have only a minimal level or rate of occurrence of imperfections that is insufficient to indicate actual tampering.

It is to be appreciated that the most preferred embodiments of the device incorporate a handler 15 and detector 16 that are configured to receive insertion of, and detect tampering with, a large range of typical configurations of lottery tickets currently in use. The method, system, and device incorporate structure adapted to accept instant lottery tickets of different sizes and shapes. The universal reader aspect provides an improvement over the prior art whereby the device can detect tampering in many types of instant lottery tickets that are sold by a number of different sources, and/or have a large range of different ticket sizes and shapes.

Preferably, the handler 15 and detector 16 are structured to accept insertion of, guide, and conduct analysis of instant lottery tickets having dimensions of about 4 inches long to about 12 inches long in a width or a length of the sides of the tickets. More preferably, the handler 15 and detector 16 are structured to receive and analyze tickets having dimensions of about 4 inches to about 8 inches in either width or length of sides of the tickets. Another most preferred embodiment has the handler 15 and detector 16 structured to receive and analyze tickets having dimensions of about 4 to 4.25 inches in either the width or the length of sides of the tickets. The adjustment of the device to enable detection of tampering on any ticket regardless of a particular size, shape, or latex composition may preferably be accomplished by utilizing the UPC and ticket authentication barcodes 13, 12 to determine the ticket type, to enable selection of the proper comparator data set on, e.g., expected reflectance characteristics of the latex surface, or expected pixel counts and patterns of the latex surface image.

The device comprises an outer housing 20, shown schematically in FIG. 3. Also as schematically represented in FIG. 3, the housing 20 preferably comprises a tamperproof seal 39 or sealing mechanism that detects or reveals evidence of unsealing of the housing 20. It is preferred that the housing be tamperproof or at least have a housing tamper indicator 40 showing to an operator evidence of someone having tried to open the housing, in order to assure security of the device. For example, a housing tamper indicator 40 may be provided in the form of a tamper-evident coating that is sealed over seams or ports 41 of the housing 20 after assembly of the device 14, and which shows evidence of attempts to open the housing 20. The device 14 may preferably comprise a self-destruct mechanism or means, schematically depicted in FIG. 3 as reference numeral 42. The self-destruct mechanism or means 42 may preferably comprise electronic tamper triggers that are activated upon the opening of sealed seams of the housing 20, the triggers providing to the controller 17 an electronic signal to lock down all operations of the controller 17 of the device 17, and to command the marker to mark as void a ticket 1 inserted in the device 17. The self-destruct mechanism thus detects evidence of attempts to unseal the housing, and may destroy operations of the detector upon detection of attempts to unseal the housing.

The housing 20 of the device 14 preferably includes openings for ports 41, 41 for connection of the interior components of the device with data input and output means such as USB, RS232, Ethernet, and similar known connectors and cables, schematically represented in FIG. 3 with reference numerals 43, 44. The housing 20 also preferably includes openings for wires connecting to electrical power supplies 28, 45, including wiring and plugs for connection to electrical supply sources. The device preferably comprises an electrical power supply 28 to the drive motor 26 of the handler 15, and an electrical supply 45 providing electrical power supply to the electronic components of the device including the detector 16 and the controller 17.

The device can include modules and means for receiving and sending of data via known wireless data communication means. The device 14 includes communication connections, electrical or wireless, among the parts and components of the device 14 as described above, to provide operable connection for sending and receiving of signals among the parts. The device 14 preferably includes a communication connection such as a data port 41 that is adapted to connect the device 14 directly or indirectly to a router 46 that can transmit data between the device 14 and the central gaming system. The router 46 may preferably be connected to the device via communication connections routed through an existing lottery terminal located at the retail location.

The device 14 also preferably includes means for communicating input and output signals between the device 14 and a user or operator of a device 14, such as a ticket purchaser or a retail store operator. The input means may include a switch 29, embodied, for example, as a push-button positioned on the housing 20 that, when activated by a user, provides an electronic signal to the controller 17 of the device to eject a ticket after it has been inserted into the housing 20 of the device. This switch 29 may be useful to cancel a ticket activation if the purchaser changes her mind about purchasing the ticket.

The output signals may include audio or visual signals to a user or operator, provided by an indicator 18 of the device. The indicator 18 will communicate certain information to a user or operator. The indicator 18 is controlled by the controller, and is connected electronically or otherwise to the controller to facilitate such. The indicator 18 may include an audio speaker 47 that produces an audio cue, such as a beeping sound, to the user upon a certain event (such as the successful scan of the barcodes of a ticket, or a notice that a ticket is invalid or voided). The indicator 18 may also include a visual display 48 such as a light source in the manner of an LED light panel, video monitor, or digital display panel that provides a visual cue that would inform the user that a ticket has been activated or voided. For example, as shown in FIG. 3, a visual display 48 that has a green indicator light indicating the ticket is "OK" for lottery play (i.e., not exhibiting evidence of tampering); a red indicator light indicating the ticket is rejected, for example, due to prior activation or evidence of tampering; and a yellow indicator light indicating that the detection process has encountered an error and cannot be completed.

As shown in FIG. 3, the device 14 preferably includes wireless or wired means for connection to a router 46. The device 14 preferably is adapted for connection to a router 46, or similar communication gateway, which is used to convey both inbound and outbound signals between the central gaming system and the device 14 via an internet connection for transmission of data. It is typical for a lottery to have installed at ticket retailer locations a dedicated router. The router provides a secure data connection between the retailer's existing lottery terminal and the central gaming system via internet data connection. Most frequently, this router is used for conducting lottery operations other than instant tickets, e.g., quick pick Lotto and other draw games. The dedicated router typically is connected to the central gaming system through a dedicated lottery connection that conveys data via a dedicated and secured internet connection. Preferably, the dedicated lottery connection for conveying data and signals is made through a satellite system or a cellular telephone system, or a combination of a satellite system and a cellular telephone system. Preferably, the dedicated lottery connection is a secure data communication system that offers a high level of data security. Thus, the device is adapted to communicate with the central gaming system via a communication module or means 56 in its controller 17, which is configured to send and receive data and signals through the router 46, utilizing a wireless data connection between the device and the router 46, or utilizing a wire connection between the device and the router 46.

In other embodiments, the communication module 56 is adapted to send and receive data and signals through an ordinary router 46 that is not dedicated to the lottery's system, or through another ordinary internet data connection such as a telephone or cable internet connection.

The device 14 is adapted for conveyance of electronic signals via wired or wireless means between a communication module 56 of the controller 17 of the device 14 and a ticket retailer's computer system. In this regard, the device 14 functions as a bridge communications device. A ticket retailer often has its own in-house computer system for tracking sales of goods at its checkout stations, usually connected to the retailer's central servers by point-of-sale (POS) terminals, e.g. cash registers. The controller 17 preferably is configured to be connected to the retailer's computer system, e.g., via the retailer's point-of-sale (POS) terminal 49. The controller 17 preferably is programmed and configured to send, among other data, the UPC barcode information that was collected by the detector 16 to the retailer's computer system.

Figure 4:
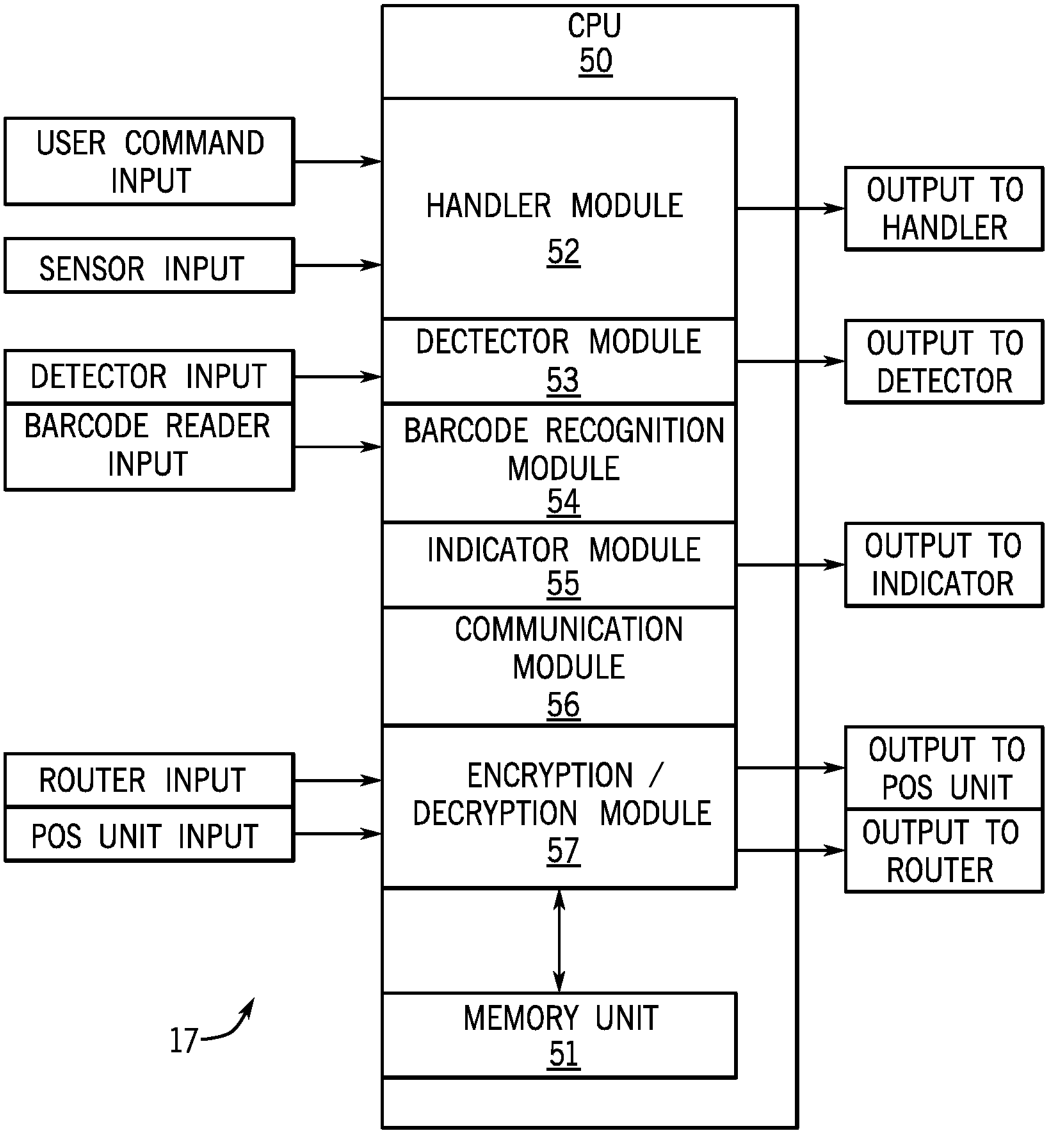
FIG. 4 is a schematic diagram representing an exemplary control system of an embodiment of the remote device.

The remote device includes a controller 17. A controller 17 according to an embodiment of a device 14 of the invention is schematically depicted in FIG. 4. The controller 17 may comprise a computer-readable medium comprising computer-executable instructions that, when executed on a processor of the controller 17, perform a method of inspecting and activating a scratch-off lottery ticket bearing game play information covered by a scratch-off coating, and bearing ticket authentication information. The controller 17 is operably connected via communication means to a central gaming computer system, which may also comprise a computer-readable medium comprising computer-executable instructions that, when executed on a processor of a central gaming computer system, perform steps in the method of inspecting and activating a scratch-off lottery ticket bearing game play information covered by a scratch-off coating, and bearing ticket authentication information.

The controller 17 comprises a specially-programmed computer processor (central processing unit or "CPU" 50, shown in FIG. 4) employing an operating system and computer units (or "modules") specially programmed to perform various functions upon execution of instructions stored in a memory unit of the processor (the memory unit may be in the form of one or more hardware or software components forming modules or units of the controller and/or the processor, all memory units collectively referred to herein as "memory 51"). The controller 17 may include one or more computing devices having memory, processing hardware, and communication hardware. The controller 17 may be a single device or a distributed device, and the functions of the controller 17 may be performed by hardware and/or instructions encoded on non-transient computer readable medium within controller. In certain embodiments, the processor includes one or more modules structured to functionally execute the operations of the controller. The description herein including modules emphasizes the structural independence of the aspects of the controller 17, and illustrates one grouping of operations and responsibilities of the controller 17. Other groupings that execute similar overall operations are understood within the scope of the present disclosure of the controller 17 of the device 14. Modules may be implemented in hardware and/or software on a non-transient computer readable storage medium, and modules and their respective operations may be shared, communicated, and/or distributed across various hardware or software components.

The processor 50 of the controller 17 may be a microprocessor unit. The processor includes a memory unit 51 for storing transitory and non-transitory data, and may include a secondary storage means. The transitory and non-transitory data to be stored may include, for example, data concerning identification of the remote device 14, its installation location, UPC data for comparison to data incorporated in ticket UPC barcodes 13, an Ethernet address or other communications data, operating software, and system status indicators. The processor 50 can encompass more than one single processor. For example, the processor 50 might include one microprocessor unit controlling mechanical devices in the system such as the handler 15 and the indicator 18, and a separate microprocessor controlling communication modules.

The processor may include a handler module 52. The handler module 52 may accept inbound signals generated by user command inputs and/or insertion sensor inputs to activate operation of the handler 15. The handler module 52 may accept, interpret and implement commands in electronic signals provided by the central gaming system via the communication module 56 to operating the handler 15 in particular ways as instructed. The handler module 52 may generate and send signals the handler system instructing the handler 15 to execute certain operations.

The processor may comprise a detector module 53 for executing programming instructions to accept data inputs and direct control operations of the detector 16 and its components. For example, the detector module 53 may accept data read by the detector 16 on the barcodes of a ticket indicating its identification and authentication information, and on a tampering status of a ticket based on evidence of tampering detected by the detector components. The detector module 53 may generate electronic signals comprising this data, and send such signals to the communications module 56, the indicator module, and/or the handler module 52, to communicate such tampering information and ticket identification and authentication information to the central gaming system and/or the retailer's point-of-sale system through a router 46 or other wired or wireless data communication means.

The processor may comprise a barcode recognition module 54 that executes instructions to interpret images containing barcodes read by the barcode reader 33 and communicated to the controller 17. The barcode recognition module 54 may interpret such barcodes to extract the embedded data contained in the barcodes, and communicate the data by generating and sending electronic signals directed to the router 46 and/or the retailer's point-of-sale terminal 49 that comprise the data.

The processor may include an indicator module 55 for accepting and interpreting user input signals, such as a signal indicating press of a pushbutton switch 29 by a user. The indicator module 55 may also accept, interpret, and convey signals from the communication module 56 conveying operation instructions based on inputs received from the detector module 53, the central gaming system, and/or the retailer's point-of-sale computer system. For example, the signal could instruct the indicator 18 to have the speaker 47 make an audio cue such as a beeping sound, or to have the visual display 48 provide a visual cue such as activating an LED light or screen display, that would inform the user that a ticket has been activated or voided.

The processor 50 is adapted to communicate, and includes a communication module 56, which is a means allowing the processor to receive, interpret, and convey electronic signals. The processor 50 includes an encryption/decryption module 57, which comprises hardware and software embodying a module and means for encryption of outbound data and decryption of inbound data embodied in electronic signals.

The processor of the device may also preferably be operably connected to a number of inputs to accommodate input of electronically communicated signals from peripherals or from a network, a number of outputs for sending outbound electronically communicated signals to peripherals other than the router 46 and the POS terminal 49, and a switching mechanism 29 that directs the device to process and execute either the sale or the return of an instant lottery ticket.

The inbound and outbound signals received and sent by the various modules of the processor may comprise electronic signals including data packets and packages.

An example of an inbound signal received by the communication module 56 of the processer is a signal originating from a detector 16 of the device 14, signaling the processor 50 via the communication module 56 about the detection of evidence of tampering. The detector signal may be communicated to the communication module 56 by means of a detector module 53 that controls operations of the detector 16 and collects and interprets electronic signals provided by the detector 16. Other examples of inbound signals are signals originating from the central gaming system directing the processor 50 to control the remote device 14 to perform a function or to change the way it performs a previously programmed function. For example, such an inbound signal from the central gaming system may contain a diagnostic data packet that would be interpreted by the remote device software on the processor 50 and used to determine whether or not the device 14 is operating properly, and to correct faulty operation. Updates to the software of the processor 50 of the device 14 would also be sent remotely. Also, updating the stored UPC barcode data in the memory 51 of the processor could be accomplished via processing of inbound signals from the central gaming system.

Inbound signals communicated to the processor 50 of the device 14 will also include signals that contain data sent by the lottery's central gaming system in response to a query sent from the processor 50 of the device 14. For example, a ticket is scanned through the device, the signal requesting activation and conveying tampering status is sent to the central gaming computer system, and then an inbound signal from the central gaming system produces a response, that response would then be sent back to the device to allow the retailer to know that the ticket has been activated or voided (or a similar function).

Outbound signals communicated by the communication module 56 of the processor 50 of the device 14 may include signals that include the tampering information generated by a detector 16 of the device; the authentication or identification information that identifies the particular ticket, and ticket sales data for inventory and accounting purposes. The processor may include an encryption/decryption module 57 that is a means for encrypting the information that is incorporated into the outbound signals. The outbound signals can be in the form of data packets. The signals can preferably include data about the activation request, including the time and place at which the ticket was inserted into the device. Another outbound signal sent by the communication module 56 of the processor of the device may be a signal sent to the indicator 18 of the device, instructing the indicator 18 to be activated to communicate to a user of the device.

The method and system of the present invention preferably are implemented using the above-described remote device 14 which constitutes a remote computer system, or an independent remote computer system programmed and adapted to perform the functions described above with respect to the operations of the device 14. The computer-implemented method provides a method for inspecting and activating a scratch-off lottery ticket bearing game play information covered by a scratch-off coating 4 and bearing ticket authentication information. The system provides a system employing the device 14 and the central computer system to inspect and activate a scratch-off lottery ticket bearing game play information covered by a scratch-off coating and bearing ticket authentication information.

The method and system may preferably use a specifically-programmed remote computer system to perform steps of detecting tampering with the coating, and generating tampering status information based on the detection of evidence of tampering. The method and system may include detecting the authentication information of the ticket in question. The method and system may include encrypting the detected authentication information and tampering status information, and communicating the encrypted authentication information and tampering status information to a specifically-programmed central computer system, for example, a central gaming system (or central computer system) of a lottery. The tampering status information may preferably be collected by the detector and communicated to the controller of the device. The controller may activate the signal to the indicator 18 based on the tampering status information.

The method and system may include or employ steps of using the central computer system to perform steps of receiving the encrypted authentication information and tampering status information from the remote computer system, decrypting the received authentication information and tampering status information, and assigning a ticket activation status to the ticket based on the tampering status information and on eligibility data that is stored in the central computer system, associated with the authentication information of that particular ticket being inspected. Then the central computer system generates an activation signal comprising the ticket activation status, and communicates the activation signal to the remote computer system. The method and system then includes or employs steps wherein the remote computer system receives the activation signal from the central computer system, extracts the ticket activation status from the activation signal, and communicates the ticket activation status to a user.

The detector inspects the integrity of the latex surface on the game play side of an instant ticket. The device will employ its detector to identify any irregularities in the latex surface, measure the level of irregularities, and using the controller, make a determination on whether the ticket is considered "tampered." Concurrently, the device employs its detector system to scan the ticket's unique barcode data containing its authentication (identification) data. The detectors are connected to the controller to allow the detector to send electronic signals to the controller conveying the tampering information and the authentication information to the device's controller. The processor then communicates this data to the lottery's central gaming system.

The processor of the remote device generates a tampering status signal based on whether or not tampering was detected. The system also detects the ticket authentication information contained in the barcode (typically contained within an authentication barcode 12) that is displayed on the ticket. The system encrypts the authentication data, and communicates the encrypted data, along with the tampering status signal indicating any detection of tampering, to the central computer system or a central gaming system.

The central computer gaming system then checks the tampering signal, and if the tampering signal indicates no tampering, the central system decrypts and uses the authentication data to determine if the ticket is entitled to be activated. The central system will determine whether to activate or void the ticket based on prior sale or validation information, or information indicating fraud that is stored in the central system. For example, if the central system's database data indicates the ticket had been previously activated or validated as a winner, or is being sold in a place or manner that might indicate fraud, then the central system will not activate the ticket. Similarly, based on a signal from the remote unit indicating evidence of tampering, the central system will not activate the ticket. The central system will signal the remote unit that the ticket is not activated and is deemed ineligible for play (voided). The remote unit will be prompted to mark the ticket as invalid, and/or destroy, deform, and/or retain the invalid ticket. On the other hand, if the ticket is eligible for activation and no tampering was detected by the remote system, then the central system will activate the ticket, and send an electronic signal back to the remote system, signaling that the ticket has been activated. The remote unit then communicates the activation status to the user by providing an activation notice, typically by emitting an audio tone to the user, and/or by engaging activation indicator lights that will provide a visual activation signal seen by the user.

Figure 5:
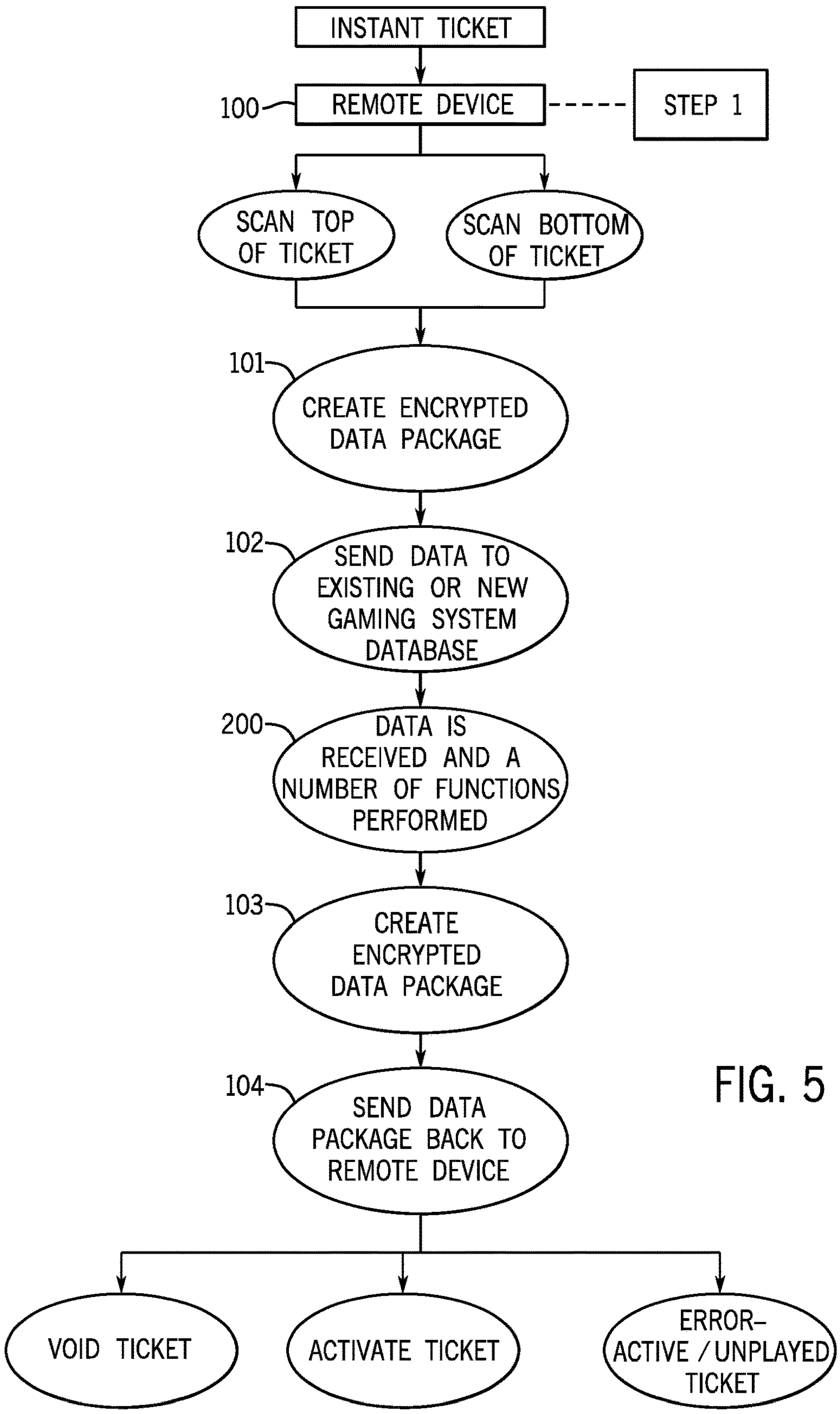
FIGS. 5 and 6 are flow charts illustrating an exemplary use of the remote device in an embodiment of a method and system using the device for inspection and activation of scratch-off lottery tickets.
Figure 6:
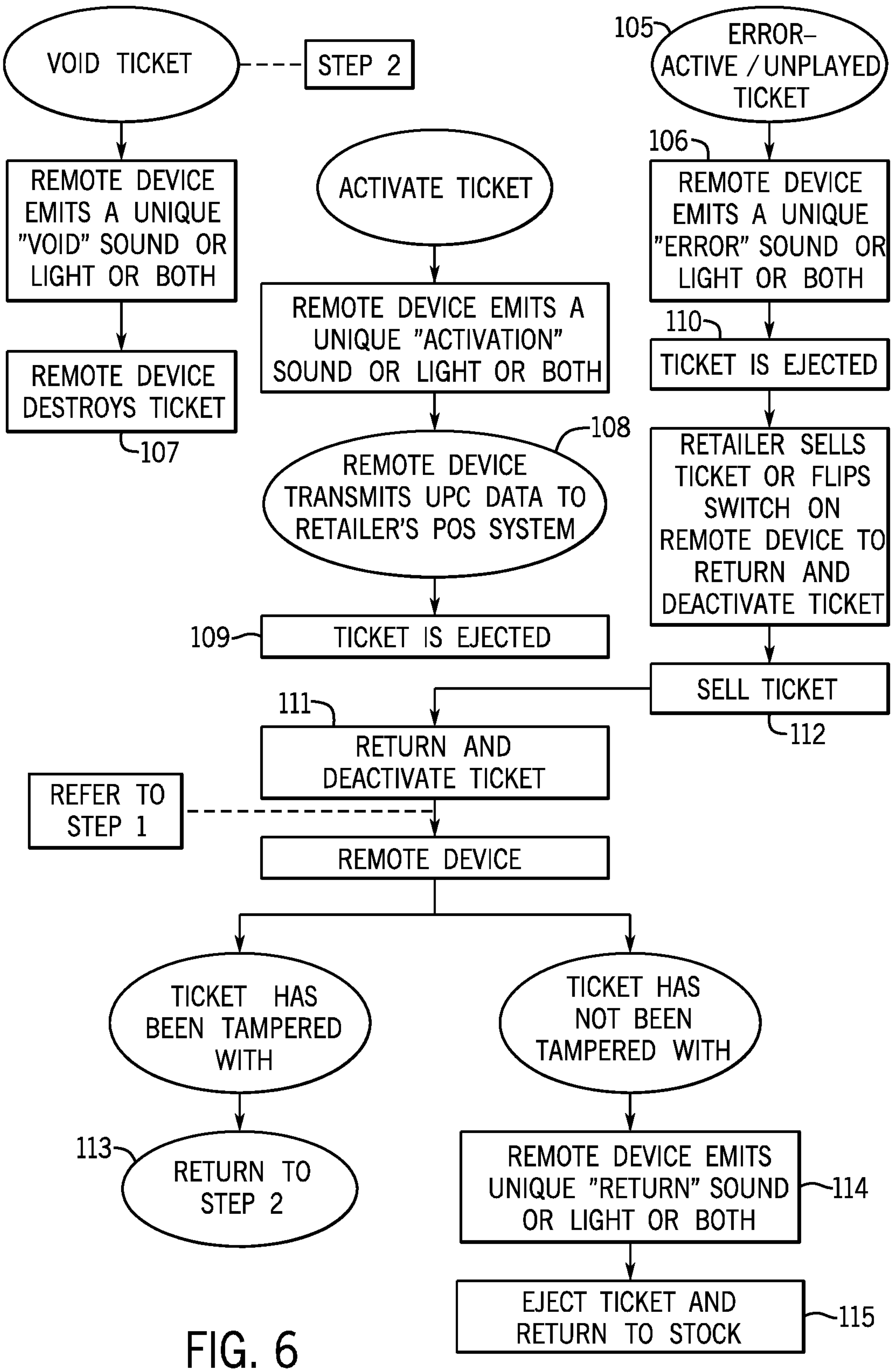

A schematic diagram showing steps in a particular embodiment of the method and system of the invention is provided in FIGS. 5-6. Starting in FIG. 5, the embodiment depicted starts with the initial steps shown at the top of the figure, wherein a ticket is scanned 100 by the detector in the remote device, an encrypted data package including the tampering status information is generated 101 and provided 102 to the central gaming system, the central gaming system interprets and performs operations 200 upon the data package, generates 103 a reply data package, and sends 104 the reply data package instructing the controller in the remote device to treat the ticket as void, activated, or subject to error arising from prior activation or lack of proper activation based on data found in the central gaming system. The central gaming system thus instructs the remote device controller to perform certain operations to direct the components of the remote device to take steps based on the ticket status.

FIG. 6 shows the next operations that are undertaken by the remote device in response to the three ticket statuses generated 105 by the central gaming system, as shown at the bottom of FIG. 5. Upon receipt of instructions from the central gaming system indicating the status of the ticket, the remote device 14 emits 106 an indication to the user based on the status. This indication may be that the ticket is to be treated as a void ticket, in which case the remote device emits an indication to a user of the void status, and the device destroys 107 the ticket, e.g., by activation of the deformation rollers of the handler 15 of the device. Upon receipt of instructions from the central gaming system indicating the ticket is to be treated as a valid, activated ticket, the remote device generates an indicator signal to the user, transmits 108 the UPC barcode data on the ticket to the retailer's POS computer system to be used to complete a sale of the ticket on the POS system, and the ticket is ejected 109 from the remote device to be given to the user.

Upon receipt of instructions from the central gaming system indicating the ticket is to be treated as a ticket subject to an activation error, the remote device emits an indication to a user of the error status, the ticket is ejected 110, and the retailer may optionally activate 111 a switch to inform the central gaming system that the ticket is to remain deactivated and return the ticket to the lottery as a deactivated or voided ticket, or to reset the remote device to attempt a second activation process in order to sell 112 the ticket. If tampering is detected, the ticket may be switched 113 to void status. If instead no tampering is detected, the device may issue 114 an indication of the ticket as remaining eligible for activations, and may eject the ticket and return it 115 to the ticket stock of the retailer for sale.

Figure 7:
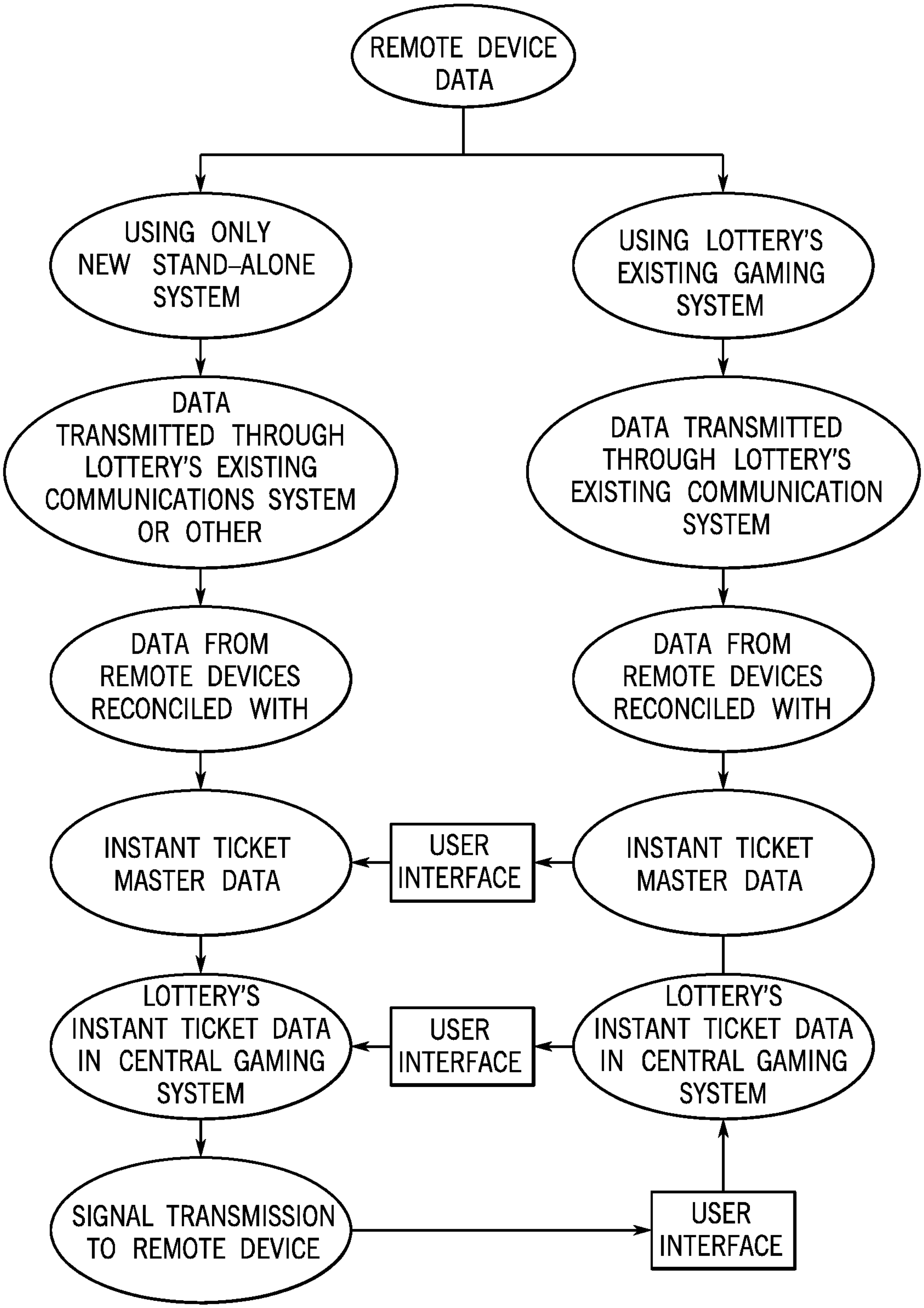
FIG. 7 is a flow chart illustrating exemplary data operations in an embodiment of the method and system utilizing the remote device.

FIG. 7 is a schematic diagram pertaining to the embodiment of the method and system of FIGS. 5-6. The diagram of FIG. 7 show data transmissions, and functions performed on data, in the "functions performed" step 200 of FIG. 5. Two alternative methods and systems are disclosed: in the first, a stand-alone system of the invention is employed to receive data from the remote devices, and to perform the listed functions upon the data thus received, and is configured to communicate data to/from the lottery's existing computer system. Functions are performed on the data by the stand-alone system as shown on the left column of FIG. 7. In the second alternative, the system of the invention uses the lottery's existing gaming system to perform the listed functions upon the data that has been received from the remote devices. Functions are performed on the data by the central gaming system, as shown on the right column of FIG. 7.

The software modules utilized in the main processor or server of the lottery's central gaming system is configured to allow the central system to communicate with a number of the remote devices described above, in order to perform all functions necessary to aggregate and process instant ticket sales and activation data sent by the remote devices. The processor of the central gaming system's computer is adapted and configured to control and conduct at least the following operations:

1. Data communication:
   a. Receive data from remote devices installed at retail locations, including ticket authentication information and ticket tampering status information—software on the central gaming system server allows continuous receipt of data from thousands of remote devices.
   b. Disseminate data to remote devices installed at retail locations, including ticket activation status information—software on the central server allows dissemination of data to any number of remote devices connected to the system, including activation signals containing data on ticket activation status.
   c. Send data to administrative users through email or other portal.
   d. Receive data from administrative users via web portal.
   e. Send data to retail users through email or other portal.
   f. Receive data from retail users through web portal.
2. Data processing:
   a. Data from remote devices is received and the location and other unique identifiers specific to that location are included and recorded. The data is then parsed to determine additional processes:
      i. Acknowledge that a ticket has been scanned/approved for sale and is requesting activation or conversely voided and triggering the destruction of the ticket.
      ii. Data is immediately parsed by the central gaming system to determine the activation status of the ticket in question by reference to past activation or other ticket eligibility or ineligibility data stored in its memory device. If the ticket has not been tampered with and has not previously been validated or scanned/activated/sold or voided, the central gaming system will report such information back to the remote device by sending a signal back to the remote device at the retail location approving the sale and activation. If the ticket in question has been tampered with, activated, sold, voided or previously validated, the central system will void the ticket. if the ticket is to be voided, the central gaming system will send a signal to the remote device directing it to void the ticket and therefore, make it impossible to activate for sale in the future. If the ticket is cleared to be sold, the central gaming system will approve the transaction at the retail location, thereby allowing the sale and activation of the ticket.
      iii. As the central gaming system aggregates data from remote devices, the data will be used to generate a number of reports for use by administrative staff, primary users, retailers and remote users who have been provided access to the report portal.
   b. Data from the gaming system is received and parsed to determine the functions necessary to carry out the required task. In order to activate and sell a ticket, data contained within the gaming system will need to be shared with the central system. For each instant ticket game, the central gaming system maintains a master data set that contains all pertinent information as it relates to that game. Prior to distribution, when instant tickets are first printed, the information that the printer prints on each ticket is provided according to the contents of this data set. Examples of the contents to be printed on each ticket include the actual play numbers or symbols, the validation code 5 (which is usually a 2-D barcode), the authentication code (that contains the unique ticket number) and the UPC barcode 13. This master data set is then accessed by the central system to identify the ticket in question and perform the requisite functions. Consequently, when a new product is introduced, the gaming system will communicate with the central system to share this information where it is then recorded within the central system for future reference.

c. Data is received from remote users—administrators, primary users, retailers, etc.—when accessing custom reports, each user has the option to login to the system in order to view the respective data. Therefore, a user name and password along with other unique identifiers is used to either allow or deny access to the respective data. Once the central system recognizes and approves user access, the respective report is updated and presented to the user.

d. Data is distributed to each or all remote devices to direct the device to perform one or a combination of its functions.

e. Data is distributed to the gaming system for recordation or to request data.

As explained above, the central gaming system is, in some lotteries, owned and operated by the lottery itself. In other lotteries, the central gaming system is separate from the lottery's own in-house computer system (e.g., the central gaming system is owned and operated by an independent contractor). In the latter situation, a respective lottery's data is stored in the central gaming system, operated by the contractor, but is made accessible to and is generally the property of the lottery. It is typical in such a system for the central gaming system to include portal access for use by the lottery or its employees, whereby the lottery's own computer system can obtain access to that lottery's data via a portal. Thus, in a system using the remote device herein, the lottery, via its employees, can have access to the compiled data accumulated from all the remote devices relating to its lottery ticket sales.

The lottery may generate reports from the collected data, for example, to track activation data, sales and inventory data, voided ticket data, and tampering data. The lottery may accordingly use the improved data access capabilities to leverage the sales and accounting data thus obtained, to improve its marketing efforts. All steps listed above may be adapted so that the lottery's computer system also contains the real-time sales and activation data that are compiled by the central gaming system on the basis of the data collected from the remote devices.

Thus, in sum, the use of the method and system provides improved means for aggregating real-time instant ticket sales data from a number of individual retailers; producing sales, inventory and liability reports to the lottery and to each instant ticket retailer; automating instant ticket inventory systems for each retailer; producing reports for the benefit of lotteries that sell instant tickets thereby enabling real-time sales analytics; and accounting and billing for instant tickets in a manner identical to that already in use for all other products by retailers who utilize point of sale systems.

The remote device allows lotteries to move away from modified accrual accounting, which allows margins of error that are not acceptable for non-government businesses. Modified accrual accounting is typically used by lotteries because under current processes, the lotteries don't know when a sale occurred (necessary for accrual accounting) and they can't associate a liability (expense) at the time of sale (which is also necessary under accrual accounting rules). With the remote device and system, when a ticket is sold, the lottery can then reconcile that ticket with the master "print data" that will then let the lottery know if the ticket was a winner. Accordingly, for example, if a player buys a ticket that is a winner on June 30$^{th}$, the expense for that prize will be allocated to June 30$^{th}$ rather than when the player actually comes in to claim the prize (which could be years later—when the period of time for claiming prizes officially ends). So if a lottery uses the remote device and system, the lottery will be able to use true accrual accounting and consequently avoid problems associated with modified accrual accounting, and associated with coordinating sales records with large retailers.

The system and method employing the device offer unexpected improvement to operations of the central gaming system that has not been offered by the prior art.

First, the database of the central gaming system can be instantaneously updated to reflect activation of scratch-off tickets on a single-ticket basis. The records in the database are thus useful real-time models of the sales status and activation status on a ticket-by-ticket basis. The operations of the central gaming (computer) system can thus be improved by automated updating provided by electronic communication between the remote device and the central computer system, both of which are specially programmed to conduct their respective functions in the system, and synergistically improve operation of each. The central computer system operates more efficiently to obtain real-time data on tampering, activation, and voiding. The remote device operates more efficiently due to access to central database information on prior activation or voiding of each particular ticket presented for analysis, unlike prior art systems. These improvements allow enhanced technical operations concerning scratch-off lottery ticket activation and voiding that have heretofore been unavailable to lotteries.

Second, the central computer system's operations also are improved by providing access to new data and offering creation of a new ticket-by-ticket database that can be compiled in the central computer system via use of the new remote devices. The new instantaneously updated ticket-by-ticket activation database will allow a central gaming computer system to compile and access real-time tampering data for scratch-off instant lottery tickets. That is, the pack activation function previously performed only after validation of a ticket in a pack can now be tied to tampering evidence relating to all tickets for which activation requests have actually been received from the remote devices, well before the pack activation stage as currently occurs under the prior art. As a result, the system and method now allow access to compiled real-time tampering data from all tickets for which activation was requested via the remote devices. This improves the central gaming system's ability to track tampering trends. The authentication data received from the remote devices with associated tampering data can be compiled and used to combat fraud and tampering. For example, a geographic area, or a particular ticket retailer, associated with an unusually high rate of requests for activation of tampered tickets, or of tickets being sold at the wrong place or time (e.g., at locations that do not correlate to market distribution data), can be detected on a timely basis. The detection of such trends allows timely investigation and action to avoid future tampering and fraud.

Third, the ticket-by-ticket tracking offers improved central gaming computer system operation through overcoming a problem specifically arising in lottery computer system networks, that is, the necessity to devote memory to records on non-activated tickets in a pack. The central computer system gains processing speed and reduced memory requirements, because such resources previously devoted to maintaining activation records on large packs of largely non-activated tickets now are freed to be used to process and store only the data on the actually activated or voided tickets in the new ticket-by-ticket activation and voiding process described herein.

Fourth, a significant and unexpected improvement over prior art that is provided by the method, system, and device is that they allow lottery retailers (with the consent or under the direction of the lottery) to display instant tickets for sale within reach of the consumer. Tickets no longer need to be protected from the consumer or locked up inside a vending machine or behind a retailer's counter. The retailer can optionally be relieved of the burden of providing an interne connection to a tamper-detection device.

Fifth, because the activation of a lottery ticket also records and distributes the authentication code to the central gaming system, a lottery may now know when a winning ticket was sold and the amount of the prize associated with that ticket. This information is currently unavailable in the vast majority of worldwide lotteries. Previously, lotteries and their players accepted the concept of not knowing whether winning tickets were sold. As previously mentioned, lotteries would wait until prizes were claimed before deriving any information about liability. At this point, a player would enter a lottery location and scan their ticket (or have the retailer or lottery employee perform the scan). The scan would identify the authentication code, reconcile it with the master print sheet and determine the prize amount, if any. With the new system, the authentication code is captured at the time of the sale, enabling lotteries and their stakeholders live information about outstanding and awarded prizes.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention, and that different specific embodiments disclosed herein can be recombined to provide other embodiments not explicitly shown or described. Accordingly, all such modifications are intended to be included within the scope of this disclosure as defined in the following claims. It should be understood that while the use of words such as preferable, preferably, preferred or more preferred utilized in the description above indicate that the feature so described may be more desirable, it nonetheless may not be necessary, and embodiments lacking the same and excluding the same also may be contemplated as within the scope of the invention. In some instances, exclusion of particular features is considered by the inventors to form an inherent part of the invention, necessary to the provision of the benefits of improved simplicity and cost-effectiveness that arise out of exclusion of the particular features from the claimed invention. The above-described embodiments of the present invention have been provided to illustrate various aspects of the invention. However, it is to be understood that different aspect of the invention shown in different specific embodiments can be combined to provide other embodiments of the invention.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A computer-implemented method of inspecting and activating a scratch-off lottery ticket bearing game play information covered by a scratch-off coating, and bearing ticket authentication information, the method comprising:

using a device comprising a specifically-programmed remote computer system to perform at least the following:

detecting tampering with the coating;

generating tampering status information based on detection of tampering;

detecting the authentication information;

encrypting the detected authentication information and tampering status information; and communicating the encrypted authentication information and tampering status information to a specifically-programmed central computer system; and using the central computer system to perform at least the following:

receiving the encrypted authentication information and tampering status information from the remote computer system;

decrypting the received authentication information and tampering status information;

assigning a ticket activation status to the ticket based on the tampering status information and on eligibility data stored in the central computer system in association with the authentication information;

generating an activation signal comprising the ticket activation status; and communicating the activation signal to the remote computer system, wherein the remote computer system receives the activation signal from the central computer system;

extracts the ticket activation status from the activation signal; and communicates the ticket activation status to a user.

2. A computer-readable medium comprising computer-executable instructions that, when executed on processors of a remote computer system and a central computer system, perform a method of inspecting and activating a scratch-off lottery ticket bearing game play information covered by a scratch-off coating, and bearing ticket authentication information, the method comprising:

using the remote computer system to perform at least the following:

detecting tampering with the coating;

generating tampering status information based on detection of tampering;

detecting the authentication information;

encrypting the detected authentication information and tampering status information; and communicating the encrypted authentication information and tampering status information to a specifically-programmed central computer system; and using the central computer system to perform at least the following:

receiving the encrypted authentication information and tampering status information from the remote computer system;

decrypting the received authentication information and tampering status information;

assigning a ticket activation status to the ticket based on the tampering status information and on eligibility data stored in the central computer system in association with the authentication information;

generating an activation signal comprising the ticket activation status; and communicating the activation signal to the remote computer system, wherein the remote computer system receives the activation signal from the central computer system;

extracts the ticket activation status from the activation signal; and communicates the ticket activation status to a user.

3. A system for inspecting and activating a scratch-off lottery ticket bearing game play data covered by a scratch-off coating, and bearing authentication information displayed on the ticket, the system comprising:

a specially-programmed computer unit comprising a detector;

an indicator; and a processor operatively connected to a memory for executing instructions, wherein the system, in response to execution of the instructions, is configured to perform at least the following:

the processor controls operation of the detector;

the detector detects tampering with the coating;

the processor generates tampering status information based on detection of tampering by the detector;

the detector detects the authentication information;

the processor encrypts the detected authentication information and tampering status information; the processor communicates the encrypted authentication information and tampering status information to a central computer system;

the processor receives an activation signal communicated by the central computer system, the activation signal comprising a ticket activation status of the ticket;

the processor extracts the ticket activation status from the activation signal; and the processor activates the indicator to indicate the ticket activation status of the ticket to a user.

4. A device for inspecting and activating a scratch-off lottery ticket bearing game play data covered by a scratch-off coating, and bearing authentication information displayed on the ticket, the device comprising:

a handler;

a detector;

a processor; and an indicator;

wherein the handler positions the ticket for inspection by the detector;

the detector detects tampering with the coating by inspecting features of the coating, and detects the authentication information displayed on the ticket;

the detector communicates to the processor the authentication information and tampering status information based on detection of tampering of the ticket;

the processor is configured to receive from the detector the tampering status information and the authentication information;

the processor is configured to generate and electronically communicate to a central computer system a request signal comprising the tampering status information and authentication information; the processor is configured to receive an activation signal communicated by the central computer system, the activation signal comprising a ticket activation status of the ticket;

the processor is configured to extract the ticket activation status from the activation signal;

based on interpretation of the ticket activation status, the processor is configured to trigger the indicator to indicate the ticket activation status;

the indicator communicates the ticket activation status to a user; and the handler returns the ticket to the user.

5. The device according to claim 4, wherein the detector comprises a barcode scanner.

6. The device according to claim 4, wherein the detector comprises an image sensor.

7. The device according to claim 6, wherein the image sensor is a camera.

8. The device according to claim 4, wherein the detector comprises a spectroscope that measures reflectance of radiation projected onto the coating by a radiation source.

9. The device according to claim 4, wherein the detector comprises an acoustic reflectometer that measures acoustic waves projected onto the coating by an audio speaker or transducer.

10. The device according to claim 4, wherein the detector comprises a video pixel recognition device that compares a captured video image of the coating to a standard video image by comparing pixel counts in the respective images.

11. The device according to claim 4, wherein the detector comprises a chemical composition detector that compares a detected chemical composition of the coating to a standard chemical composition of a standard coating.

12. The device according to claim 4, wherein the detector comprises a thickness gauge that compares the thickness of the ticket to a standard ticket thickness.

13. The device according to claim 4, wherein the processor comprises an encryption module that encrypts the authentication information.

14. The device according to claim 4, wherein the processor comprises an encryption module that encrypts the tampering status information.

15. The device according to claim 4, wherein the processor comprises a decryption module that decrypts the activation signal.

16. The device according to claim 4, wherein the handler is structured to accept and guide tickets having dimensions in a range of about 4 inches to about 8 inches in width or length into position for inspection by the detector.

17. The device according to claim 4, wherein the device comprises an outer housing and a sealing mechanism that prevents unsealing of the housing.

18. The device according to claim 17, wherein the device comprises a tamper detection mechanism that detects evidence of unsealing of the housing and provides a housing tamper indicator.

19. The device according to claim 17, wherein the device comprises a self-destruct mechanism that detects evidence of attempts to unseal the housing, and activates a self-destruction mechanism that will destroy operations of the device and prevent access to data stored in the device.

20. The device according to claim 4, wherein the device is a bridge communication device.

21. The device according to claim 4, wherein the device comprises a ticket marker that physically alters a voided ticket.

22. The device according to claim 21, wherein the ticket marker is a cutter that marks the ticket by cutting off a portion of the ticket.

23. The device according to claim 21, wherein the ticket marker is a hole punch that marks the ticket by cutting a hole in the ticket.

24. The device according to claim 21, wherein the ticket marker is a punch that marks the ticket by deforming the ticket without producing chaff.

25. The device according to claim 21, wherein the ticket marker marks the ticket by applying an ink mark upon a surface of the ticket.

26. A device for detecting evidence of tampering on a scratch-off lottery ticket bearing game play data covered by a scratch-off coating, the device comprising:

a handler; a detector; a processor; and an indicator;

wherein the handler positions the ticket for inspection by the detector;

the detector detects tampering with the coating by inspecting features of the coating;

the detector communicates to the processor tampering status information based on detection of tampering of the ticket;

based on the tampering status information, the processor triggers the indicator to indicate a ticket tampering status; and the indicator communicates the ticket tampering status to a user.

27. The device according to claim 26, wherein the detector comprises a barcode scanner.

28. The device according to claim 26, wherein the detector comprises an image sensor.

29. The device according to claim 26, wherein the detector comprises a spectroscope that measures reflectance of radiation projected onto the coating by a radiation source.

30. The device according to claim 26, wherein the detector comprises an acoustic reflectometer that measures reflectance or attenuation, or patterns of reflectance or attenuation, of acoustic waves projected onto the coating by an audio speaker or transducer.

31. The device according to claim 26, wherein the detector comprises a video pixel recognition device that compares a captured video image of the coating to a standard video image by comparing pixel counts in the respective images.

32. The device according to claim 26, wherein the detector comprises a thickness gauge that compares the thickness of the ticket to a standard ticket thickness.

33. The device according to claim 26 wherein the detector comprises chemical composition detector that projects a light beam at the coating, vaporizes a portion of the coating to produce a vapor, and analyzes a chemical composition of the vapor to determine chemicals present in the vapor.

34. The device according to claim 26, wherein the device comprises a ticket marker that physically alters a voided ticket.

35. The device according to claim 34, wherein the ticket marker is a cutter that marks the ticket by cutting off a portion of the ticket.

36. The device according to claim 35, wherein the ticket marker marks the ticket by applying an ink mark upon a surface of the ticket.

37. The device according to claim 34, wherein the ticket marker is a hole punch that marks the ticket by cutting a hole in the ticket.

38. The device according to claim 34, wherein the ticket marker is a punch that marks the ticket by deforming the ticket without producing chaff.

39. The device according to claim 34, wherein the ticket marker is a roller that marks the ticket by deforming the ticket without producing chaff.

40. The device according to claim 26, wherein the handler is structured to accept and guide tickets having dimensions in a range of about 4 inches to about 8 inches in width or length into position for inspection by the detector.

41. The device according to claim 26, wherein the device comprises an outer housing and a sealing mechanism that prevents unsealing of the housing.

42. The device according to claim 41, wherein the device comprises a tamper detection mechanism that detects evidence of unsealing of the housing and provides a housing tamper indicator.

43. The device according to claim 42, wherein the device comprises a self-destruct mechanism that detects evidence of attempts to unseal the housing, and activates a self-destruction mechanism that will destroy operations of the device upon detection of attempts to unseal the housing.

* * * * *